United States Patent
Featonby et al.

(10) Patent No.: US 11,194,688 B1
(45) Date of Patent: Dec. 7, 2021

(54) APPLICATION ARCHITECTURE OPTIMIZATION AND VISUALIZATION

(71) Applicant: Amazon Technologies, Inc., Seattle, WA (US)

(72) Inventors: Malcolm Featonby, Sammamish, WA (US); Jacob Adam Gabrielson, Seattle, WA (US); Kai Fan Tang, Port Coquitlam (CA); John Merrill Phillips, Seattle, WA (US); Leslie Johann Lamprecht, Seattle, WA (US); Letian Feng, Seattle, WA (US); Roberto Pentz De Faria, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 16/406,354

(22) Filed: May 8, 2019

(51) Int. Cl.
G06F 11/32 (2006.01)
G06F 9/50 (2006.01)

(52) U.S. Cl.
CPC .......... G06F 11/321 (2013.01); G06F 9/505 (2013.01); G06F 9/5077 (2013.01); G06F 9/5083 (2013.01)

(58) Field of Classification Search
CPC ....... G06F 9/505; G06F 9/5077; G06F 9/5083
See application file for complete search history.

(56) References Cited

U.S. PATENT DOCUMENTS

| | | | |
|---|---|---|---|
| 9,122,562 B1* | 9/2015 | Stickle | G06F 11/3409 |
| 9,798,527 B1* | 10/2017 | Bendersky | G06F 16/9024 |
| 2015/0040017 A1* | 2/2015 | Roche | G06F 11/32 715/736 |
| 2018/0314945 A1* | 11/2018 | Breternitz | G06N 3/0454 |
| 2019/0392002 A1* | 12/2019 | Lavasani | G06F 8/41 |
| 2020/0293356 A1* | 9/2020 | Bonaud | G06F 9/5027 |

* cited by examiner

Primary Examiner — Jacob D Dascomb
(74) Attorney, Agent, or Firm — Lee & Hayes, P.C.

(57) ABSTRACT

Techniques for an optimization service of a service provider network to generate an architecture diagram that represents an architecture of a web-based application. The optimization service may use the architecture diagram to determine modifications or changes to make to the application. For example, the optimization service may compare the architecture diagram with optimized architecture diagrams that represent application best practices, and determine the modifications or change to make to the application to optimize the application and bring the application in-line with best practices. Further, the optimization service may use the architecture diagram to generate a visualization, and provide the user account with the visualization of the architecture diagram to show users their application architecture.

21 Claims, 12 Drawing Sheets

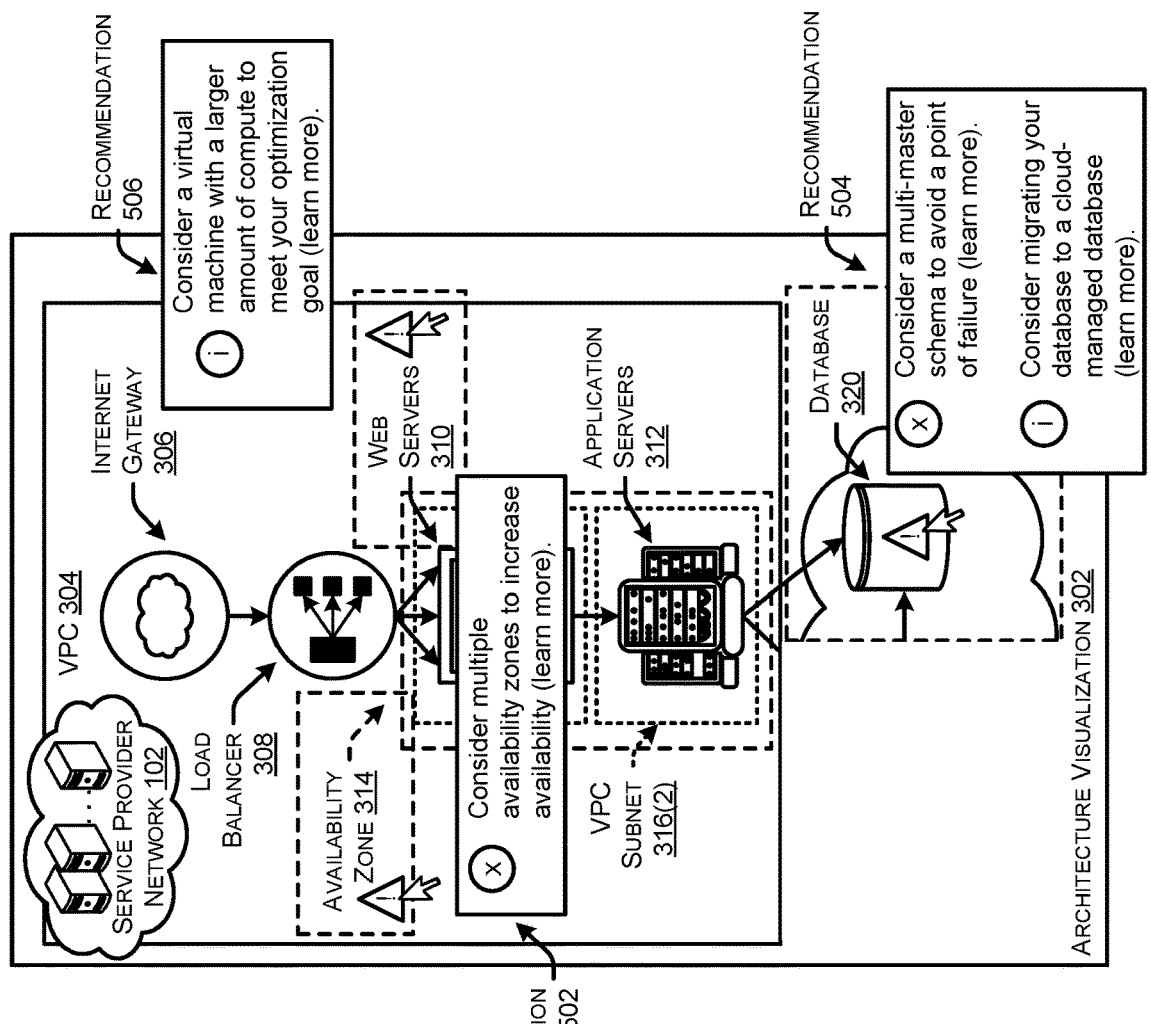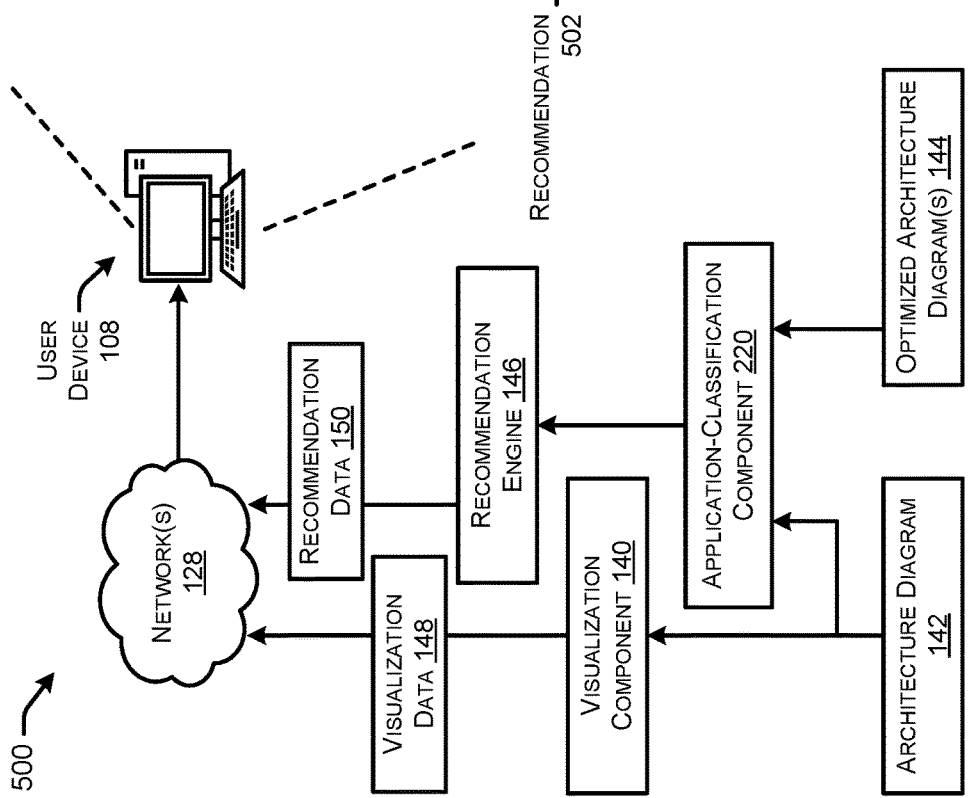
FIG. 5

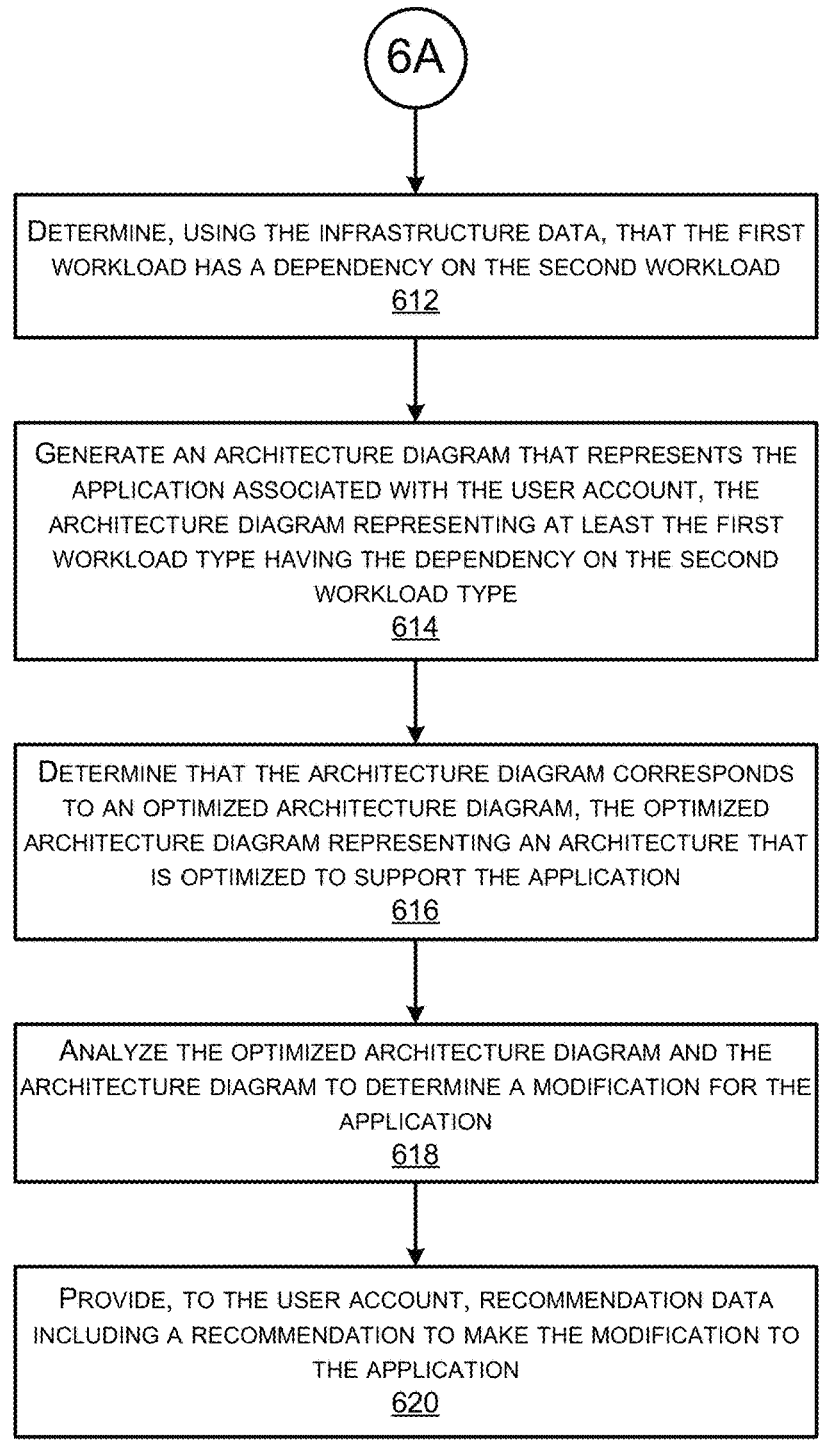

700

```
┌─────────────────────────────────────────────────────────────────┐
│ HOST, AT LEAST PARTLY BY A SERVICE PROVIDER NETWORK, AN         │
│ APPLICATION ON BEHALF OF A USER ACCOUNT REGISTERED WITH THE     │
│ SERVICE PROVIDER NETWORK, THE APPLICATION COMPRISING A FIRST    │
│ WORKLOAD AND A SECOND WORKLOAD                                  │
│                              702                                │
└─────────────────────────────────────────────────────────────────┘
                                 ↓
┌─────────────────────────────────────────────────────────────────┐
│ IDENTIFY A FIRST WORKLOAD TYPE ASSOCIATED WITH THE FIRST        │
│ WORKLOAD                                                        │
│                              704                                │
└─────────────────────────────────────────────────────────────────┘
                                 ↓
┌─────────────────────────────────────────────────────────────────┐
│ IDENTIFY A SECOND WORKLOAD TYPE ASSOCIATED WITH THE SECOND      │
│ WORKLOAD                                                        │
│                              706                                │
└─────────────────────────────────────────────────────────────────┘
                                 ↓
┌─────────────────────────────────────────────────────────────────┐
│ IDENTIFY INFRASTRUCTURE DATA ASSOCIATED WITH THE USER ACCOUNT   │
│ AND REPRESENTING AT LEAST A PORTION OF THE APPLICATION          │
│                              708                                │
└─────────────────────────────────────────────────────────────────┘
                                 ↓
┌─────────────────────────────────────────────────────────────────┐
│ DETERMINE AN ARCHITECTURE DIAGRAM THAT REPRESENTS THE           │
│ APPLICATION, THE ARCHITECTURE DIAGRAM REPRESENTING THE FIRST    │
│ WORKLOAD TYPE HAVING A DEPENDENCY ON THE SECOND WORKLOAD TYPE   │
│                              710                                │
└─────────────────────────────────────────────────────────────────┘
                                 ↓
┌─────────────────────────────────────────────────────────────────┐
│ DETERMINE A DIFFERENCE BETWEEN THE ARCHITECTURE DIAGRAM AND AN  │
│ OPTIMIZED ARCHITECTURE DIAGRAM, THE OPTIMIZED ARCHITECTURE      │
│ DIAGRAM REPRESENTING AN APPLICATION ARCHITECTURE THAT IS        │
│ OPTIMIZED TO SUPPORT THE APPLICATION                            │
│                              712                                │
└─────────────────────────────────────────────────────────────────┘
                                 ↓
┌─────────────────────────────────────────────────────────────────┐
│ PROVIDE, TO A CLIENT DEVICE ASSOCIATED WITH THE USER ACCOUNT,   │
│ RECOMMENDATION DATA INDICATING A CHANGE DETERMINED FOR THE      │
│ APPLICATION BASED AT LEAST IN PART ON THE DIFFERENCE            │
│                              714                                │
└─────────────────────────────────────────────────────────────────┘
```

FIG. 7

APPLICATION ARCHITECTURE OPTIMIZATION AND VISUALIZATION

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

Service provider networks may utilize virtualization technologies that allow individual physical computing devices to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device.

These cloud-based services may provide users with a variety of types of workloads from which users can select to be components for a hosted application or service. Generally, a workload may comprise one or more processes that run on a virtual computing resource to deliver computer functionality, such as a database workload, a web server workload, and so forth. By selecting the different workload types provided by the various cloud-based services, users can create end-to-end applications or services that deliver a business or compute value, such as a customer-facing application or a backend process. However, as the number and types of workloads used to build an end-to-end application increases, it becomes more difficult to analyze and manage complex application architectures.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a diagram of an example data flow where an optimization service provides a user device with image data representing a visualization of an architecture diagram for an application, and the user device presents the visualization of the architecture diagram along with recommendations for modifying the application.

FIGS. 6A and 6B collectively illustrate a flow diagram of an example method for a service provider network to identify workload types for workloads of an application, identify network traffic data indicating an amount of data flowing between workloads, generate an architecture diagram that corresponds to an optimized architecture diagram, determine a modification for the application, and provide recommendation data to a user account including a recommendation to make the modification to the application.

FIG. 7 illustrates a flow diagram of an example method for a service provider network to generate an architecture diagram for an application that corresponds to an optimized architecture diagram, determine a difference between the architecture diagrams, and provide recommendation data to a user account including a recommendation to make a change to the application.

DETAILED DESCRIPTION

Figure 1:
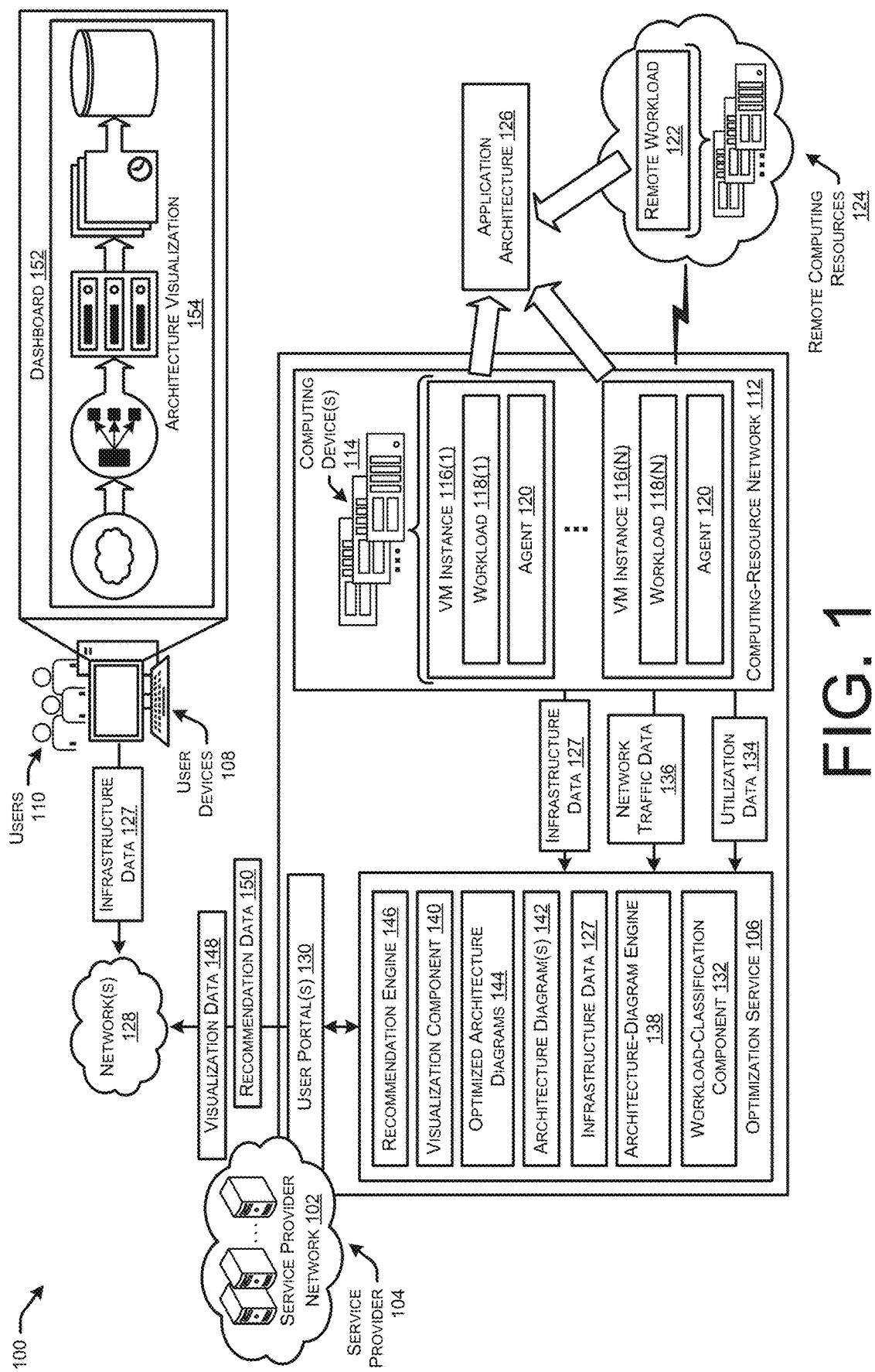
FIG. 1 illustrates a system-architecture diagram of an example environment in which an optimization service of a service provider network generates a visualization of an architecture diagram for an application, and provides a user device with the visualization of the architecture diagram and recommendation data indicating recommendations to modify the application architecture.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

Generally, a workload may comprise one or more processes running on a virtual computing resource (e.g., virtual machine instance) in order to provide a business or compute value, such as a customer-facing application or a backend process. Depending on the type, the virtual compute resource may be allocated different combinations and amounts of hardware resources (e.g., CPU, memory, disk, network bandwidth, etc.) to be optimized or biased to support process(es) for a particular workload. For instance, a cloud-based database service provided by a service provider network may offer database workloads that comprise virtual compute resources that are allocated larger amounts of memory or disk, but lower amounts of CPU, and that run or execute process(es) for implementing relational databases. As another example, a cloud-based compute service may offer web-server workloads that comprise virtual compute resources that are allocated larger amounts of CPU, but lower amounts of disk, and run or execute process(es) for implementing a web server that response to web-based client requests.

Accordingly, cloud-based (or "network based") service provider networks can provide cloud-based services that deliver different types of workloads that users can select to build a web-application architecture for an application (or service). In some examples, each type of workload used to build the application architecture may be broken into a logical chunk called a "tier" where every tier is assigned a role depending on the workload type. In this way, users can create tiered web applications (e.g., 2-tiered applications, 3-tiered applications, etc.) that may be scalable on computing resources of the service provider network to implement a business or compute value, such as a scalable customer-facing application or a backend process.

Having a wide variety of workload types is useful in that users of the service provider network are able to build a variety of end-to-end applications with different complexities. However, as the number and types of workloads used to build an end-to-end application increases, it becomes more difficult to analyze and manage complex application architectures. For example, a user may have developed a web-based application and have specified a maximum acceptable latency as a customer metric for that web-based application. If the web-based application is failing to achieve the desired latency for responding to requests, it may be difficult to determine what component or dependency in the application architecture is responsible for the bottleneck. Further, users may develop application architectures that do not comply with best practices for application architectures, and may in turn suffer from availability risks (e.g., single point of failure), data flow bottlenecks, inefficient or less optimized workload types, and/or other undesirable characteristics for an application architecture.

This disclosure describes techniques and technologies implemented by an optimization service of a service provider network to generate an architecture diagram that represents an architecture of a web-based application. The optimization service may use the architecture diagram to determine modifications or changes to make to the application. For example, the optimization service may compare the architecture diagram with optimized architecture diagrams that represent application best practices, and determine the modifications or changes to make to the application to optimize the application and bring the application in-line with best practices. Further, the optimization service may use the architecture diagram to generate a visualization, and provide the user account with the visualization of the architecture diagram (optionally annotated with one or more recommendations for improving the architecture) to show users their application architecture.

The service provider network may provide the optimization service to users such that users can log into their user accounts registered with the service provider network and opt-in or otherwise request that the optimization service perform some or all of the techniques described herein. For instance, users may, via their user accounts, request or opt in for the optimization service to collect various data in order to generate the architecture diagram that represents the applications that are hosted at least partly by the service provider network of the service provider.

To generate the architecture diagrams that represent the workloads (and/or other components), dependencies of those workloads, flow of network communication data between the workloads, and/or other portions of the applications, the optimization service may collect various types of data associated with the applications. For example, the optimization service may collect utilization data indicating amounts and types of hardware computing resources being utilized by the different workloads. Generally, to determine a workload type (and/or a virtual machine instance type), the optimization service may map the utilization data of workload to predefined workload types offered by the service provider network based on the "shape" of the utilization characteristics of the workloads. The shape of utilization characteristics can refer to the amount of usage across each different compute dimension, such as processing, memory, storage, networking, and optionally graphics processing. For example, the utilization data of a workload may be mapped to a workload category of "database," the utilization data of another workload may be mapped to a workload category for "web servers," and so forth. In this way, for each workload in an application, the optimization service may determine a workload type, and generate a tiered structure representing the different workload types for the architecture diagram.

In some examples, the optimization service may have access to infrastructure data, such as templates or descriptions, that describes the computing resources and configuration settings for the application architecture. For instance, users may provide an infrastructure template, such as a file (for example, a JavaScript Object Notation (JSON) or YAML-formatted text file) that describes the computing resources and associated configuration settings used to implement a computing resource stack, along with descriptions of interconnections among the resources. The infrastructure data may comprise metadata that describes the virtual infrastructure of the application architecture in the cloud, such as security groups for the different workloads or components, load-balancing configurations, auto-scaling groups, and/or other infrastructure data that comprises the virtual infrastructure of the application hosted in the service provider network.

Further, the optimization service may gather network traffic data that indicates a flow of data between workloads of the application, as well as dependencies between the workloads. For instance, the optimization service may identify security groups for the different workloads, and the permissions granted to different workloads in the security groups. These permissions may indicate which workloads are able to communicate with other workloads, and/or dependencies of the different workloads on each other. For example, a web server workload may have a dependency on an application server workload that includes code to analyze requests from client devices received via the web server workload. Further, the optimization service may determine types of data flowing between workloads (e.g., HTTP traffic, SDP traffic, etc.) to determine information associated with the workloads and/or dependencies.

Using the utilization data, infrastructure data, network traffic data, etc., the optimization service may generate a dependency map for the workload types of the application. The optimization service may utilize that dependency map, as well as other information, to generate an architecture diagram that represents the end-to-end application architecture diagram for the application that is being hosted on behalf of a user account. The optimization service may utilize the architecture diagram to make various recommendations for the user account regarding their application.

In some examples, the optimization service may have generated and/or received optimized architecture diagrams for different application types. For example, a standard 3-tier application architecture for a customer-facing application may have one or more optimized architecture diagrams that represent best practices for the application. The optimization service may compare, such as using pattern matching, the architecture diagram determined for the application with the optimized architecture diagram(s) to identify differences between the diagrams. For example, the optimization service may determine that the architecture diagram for the application has a single availability zone, but that best practices are to have two or more availability zones to help avoid availability risks (e.g., single points of failure). As another example, the optimization service may determine that there is a bottleneck within a dependency of the architecture diagram, and that a multi-master solution may help reduce bottlenecks that may cause latency issues. The optimization service may provide the user account with recommendation data indicating the modifications or changes to make to the application architecture to help bring the application in line with best practices, and/or otherwise optimize the application.

Further, the optimization service may utilize the architecture diagram to generate a visualization of the application architecture, and provide the user account with access to view (e.g., via a console and/or dashboard) the visualization of the architecture diagram. In this way, users are able to view the entire architecture or infrastructure of their applications, including any workloads that are managed or hosted on networks other than the service provider network (e.g., remote computing networks). In some instances, the visualization may further include indications of the recommendations for the user to view. For example, a visual indictor (e.g., icon, highlighting, bounding box, etc.) associated with a portion or region of the visualization may indicate to the user that the corresponding component of the application architecture may be optimized. In further examples, the visual indicator may be at least partly interactive such that the recommendation to alleviate the problem with the application architecture, or bring the architecture in-line with best practices, will be presented to the user based an interaction with the visual indicator (e.g., hovering, selection input, etc.).

In some examples, the optimization service may further provide recommendations, or indicate portions of the architecture diagram resulting in inefficiencies, based on user-provided metrics. In this way, user-provided metrics or goals can drive optimization of the architecture of the application. For instance, a user may require or provide input indicating that the compute platform of their application achieve no less than 300 units produced per second, and no more than 1,000 units produced per second. Using reinforcement techniques, and/or machine-learning approaches, the optimization service may determine recommendations for the application architecture selection to achieve the user-specified optimization goals. For example, if the user inputs metrics indicating they want latency for request/response for the application to be less than 700 milliseconds (ms), the optimization service can use machine-learning techniques to determine what resource metrics impact latency, and may determine hardware/scaling recommendations for the application architecture accordingly. Users may then measure the success of the application architecture based on the number of units produced. In some instance, recommendations to modify an application architecture may include recommendations to migrate the application from a current architecture into a different, more optimized architecture.

This disclosure describes techniques that help optimize the performance of applications by providing users with recommendations regarding their end-to-end application architectures, and also provide users with visualizations of their application architectures. The optimization service may determine modifications for application architectures, or entirely new application architectures, that are more optimized for an application. By increasing the optimization of the compute resources, workloads, and other components of an application architecture, the performance of the application may increase, and the overall utilization of computing resources provided by servers or other hardware devices (e.g., CPU, GPU, memory, disk, and/or network availability) may be more efficiently utilized. For example, by implementing a solution or modification to alleviate a bottleneck in an application architecture, the computing resources "downstream" from the bottleneck may be more effectively utilized, thereby reducing underutilization. As another example, the techniques described herein may identify an opportunity to reduce the amount of resources being utilized. For instance, a user may have provisioned workloads of a particular category to help drive down latency without knowing that a bottleneck in the application architecture is causing the latency in the application. The optimization service may help the user identify, and provide a recommendation to alleviate, the bottleneck, thereby allowing the user to remove the unnecessary workloads of the particular category from the application to prevent underutilization of computing resources in a computing-resource network.

Although the techniques described herein are often described with respect to workloads that comprise an application architecture, the techniques are applicable to any logic executing on one or more computing devices to achieve a particular function. For instance, the techniques are not limited to virtual computing resources that execute various processes with different functionality to achieve an end-to-end functionality, service, and/or application. Rather, the techniques are applicable to other types of technologies including logic or code running on computing devices to achieve an overall functionality. Further, in some examples the techniques are applied for a single workload, or a fleet of workloads at scale. In some examples, a workload may be a single virtual computing resource, or a fleet of virtual computing resources that are scalable to support increases and decreases in use, and may be placed behind one or more load balancing devices of the service provider network. In such examples, the techniques described herein may be applicable to all virtual computing resources in a fleet that support various instances of the same workload.

Although the techniques described herein are with reference to workloads comprising virtual machines, or VM instances, and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network 102 generates a visualization of an architecture diagram for an application, and provides a user device with the visualization of the architecture diagram and recommendation data indicating recommendations to modify the application architecture.

As illustrated, a service provider network 102 may be operated and/or managed by a service provider 104. The service provider network 102 may provide various services to users 110 to fulfil their computing resource needs, such as cloud-based computing resources. For example, the service provider network 102 may provide cloud-based, scalable, and network accessible compute power services, storage services, database services, and/or other services. Users 110 may utilize user devices 108 to subscribe for use of the computing resources and/or services provided by the service provider network 102. The service provider network 102 may provide a computing-resource network 112 that supports web-based applications or services on behalf of the users 110. The service provider network 102 may include an optimization service 106 that is configured to generate architecture diagrams that may be utilized to determine changes or modifications to make to an application architecture, generate visualizations for users 110 to view their end-to-end application architectures, and provide user devices 108 with the visualization of the architecture diagram and recommendation data indicating recommendations to modify the application architecture.

The service provider network 102 may span across different geographic regions, and include or be associated with a computing-resource network 112 that includes clusters of managed computing devices 114 (e.g., servers) stored in data centers located across the different geographic regions. In this way, users 110 who have subscribed for use of the network-based services supported by computing resources in the data centers need not invest in and maintain the computing infrastructure required to implement the various services that they may need. In some examples, users 110 of the service provider network 102 may access or utilize computing resources of the computing devices 114 in the data centers located in different geographic regions such that users 110 located in these different geographic regions are provided with access these resources and services.

Generally, the computing devices 114 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 114 may be various types of computing devices, such as devices that have different chip set generations, are from different vendors, have different hardware architectures, and so forth.

Thus, the computing resources of the computing-resource network 112 provided by the computing devices 114 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 114 may implement or communicate with a virtualization layer and corresponding virtualization systems (e.g., a hypervisor on a server), whereby the compute resources are represented by, and made accessible as, virtual computing resources, such as instances of virtual machine or "VM instances" 116. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 114 may each support VM instances 116 that may be different types of VM instances provided by the service provider network 102. For instance, computing devices 114 may support one or more VM instances 116 that are of a first VM instance type, and computing devices 114 may support one or more VM instances 116 that are of a second VM instance type. Rather than allocating all the computing resources of an entire computing device 114 to support a workload for the user 110, the service provider network 106 may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 114. These VM instances 116 may emulate computing devices 114 to operate and support workloads, and may have their own operating systems, processing capabilities, storage capacity, and network connections or interfaces.

Users 110 may create user accounts with the service provider 104 to utilize the resources and services of the service provider network 102. The users 110 may utilize their user devices 108 to communicate over one or more networks 128 (e.g., WANs, PANs, LANs, etc.) with the service provider network 102. The user devices 106 may comprise any type of computing device configured to communicate over network(s) 128, such as mobile phones, tablets, laptop computers, desktop computers, televisions, servers, and/or any other type of computing device. The users 110 may desire that the service provider network 102 host or support workloads 118(1)-118(N) on the computing resource network 112 that is managed by the service provider 104. Accordingly, the users 110 may, via their user account, request that a workload 118 be launched on their behalf, and provide workload data via one or more user portals 130 (e.g., web console, command line interface (CLI), application programming interface (API), etc.).

Generally, a workload 118 may comprise a virtual computing resource (e.g., virtual machine instance 116) on which one or more processes are running to provide a business or compute value, such as a customer-facing application or a backend process. The workloads 118 may comprise different types of VM instances 116 that run different types of processes to implement various computer functionalities for an application. For instance, a cloud-based database service provided by a service provider network may offer database workloads that comprise VM instances 116 that are allocated larger amounts of memory or disk, but lower amounts of CPU, and that run or execute process(es) for implementing relational databases. As another example, a cloud-based compute service may offer web-server workloads 116 that comprise VM instances 116 that are allocated larger amounts of CPU, but lower amounts of disk, and run or execute process(es) for implementing a web server that response to web-based client requests.

Accordingly, a user 110 may create, define, or otherwise specify an application architecture 126 that includes one or more workloads 118 of various workload types arranged in an architecture that results in dependencies between the workloads 118. For instance, a first workload 118(1) may be a web server that receives data from clients of the application architecture 126 and passes that data onto a second workload 118(2) that is a database workload. In such an example, the first workload 118(1) would have a dependency upon the second workload 118(2) in that it can only pass data to the second workload 118(2) at a rate that the second workload 118(2) can process the incoming data.

To define the application architecture 126, the users 110 may provide the service provider network 102 with infrastructure data 127 that generally describes the virtual infrastructure of the application architecture 126. In this way, the users 110 are able to describe the virtual topology of their application. The infrastructure data 127 may comprise data such as templates or descriptions that describe the computing resources and configuration settings for the application architecture 126. For instance, users 110 may provide an infrastructure template, such as a file (for example, a JavaScript Object Notation (JSON) or YAML-formatted text file) that describes the computing resources and associated configuration settings used to implement a computing resource stack, along with descriptions of interconnections among the resources. The infrastructure data 127 may comprise metadata that describes the virtual infrastructure of the application architecture 126 in the cloud, such as security groups for the different workloads or components, load-balancing configurations, auto-scaling groups, and/or other infrastructure data that comprises the virtual infrastructure of the application hosted in the service provider network 102. In some examples, at least a portion of the infrastructure data 127 may be obtained from the computing-resource network 112, such as from an agent 120. For instance, if the user 110 makes changes to their application architecture 126, an agent 120 (and/or a service of the service provider network 102) may detect the change and provide updated infrastructure data 127 that represents the current state of the application architecture 126.

In some examples, a user 110 may further define an application architecture 126 that includes a remote workload 122 that is at least partially supported by remote computing resources 124. For instance, the user 110 may have a different service provider support a remote workload 112 using remote computing resources 124 on behalf of the user 110 to implement at least a portion of the application architecture 126. In some instances, the remote computing resources 124 may be implemented in a network that is at least partially managed by the user 110 themselves.

Accordingly, the service provider network 102 may include or be associated with a computing-resource network 112 that supports one or more workloads 118 that define application architectures 126 on behalf of users. The application architectures 126 may comprise one or more types of workloads 118 that may be broken into a logical chunk called a "tier" where every tier is assigned a role depending on the workload type. In this way, users 110 can create tiered web application architectures 126 (e.g., 2-tiered applications, 3-tiered applications, etc.) that may be scalable on computing resources/devices 114 of the service provider network 102 to implement a business or compute value, such as a scalable customer-facing application or a backend process.

In some examples, a user 110 that has an application with the application architecture 126 at least partly supported by the service provider network 102 may opt-in, or otherwise request, that the optimization service 106 collect various data in order to generate an architecture diagram that represents the application architecture 126 of the application. In such examples, the optimization service 106 may install or deploy an agent 120 onto the VM instances 116 to collect utilization data 134 for the VM instances 116 and/or workloads 118. The utilization data 134 may indicate resource-consumption data for the workloads 118, such as an amount and/or combination of computing resources utilized or consumed by the workloads 118 (e.g., CPU usage, memory usage, network bandwidth usage, disk usage, etc.). The utilization data 134 may indicate the amounts and/or combinations of the computing resources being utilized by the workloads 118 over any period of time (e.g., an hour, a day, a week, a month, etc.) in order to determine a "shape" of the utilization characteristics of the workloads. Further, the agent 120 may collect other utilization data 134, such as configuration data indicating information about the application stack and/or operating system for each workload 118 and or associated VM instance 116, such as what processes are running, what binary backs the processes, what repositories those binaries are sourced from, what operating system and/or version is running, what configuration parameters are defined for the operating system, disk subsystem, database stack, etc., and/or any other configuration data. In some examples, to collect the utilization data 134 for the remote workload 122, the user 110 may provide logs, histories, or other indications of the utilization data 134 to the optimization service 106.

Upon collecting the utilization data 134, a workload-classification component 132 may determine workload types for each of the workloads 118. For example, the workload-classification component 132 may analyze the utilization data 134 for workloads 118 that are supported by the service provider network 102, and based on the resource-utilization characteristics (or "resource-consumption characteristics") of the workloads 118, performed techniques, such as clustering, to group the workloads into categories or types based on the shape of their resource utilization. To illustrate, one predefined workload type may be a "database workload type" and generally correspond to the resource-utilization characteristics for database workloads 118 (e.g., low compute consumption, high storage consumption, etc.). Another predefined workload type (or category) may be a "compute heavy category" and generally correspond to the resource-utilization characteristics for computationally-biased workloads 118.

Each of the workload types determined by the workload-classification component 132 may be defined by a respective resource-utilization model that indicates that shape of the resource-utilization characteristics for the workloads 118 represented by the workload type. The resource-utilization models may indicate amounts of the different types of resources consumed by the representative workloads 118 (e.g., amounts of CPU, storage, memory, networking throughput, GPU, etc.), and or combinations of the different types of resources consumed by the representative workloads 118.

To determine workload types for each of the workloads 118 that support the application architecture 126, the workload-classification component 132 may map the utilization data 134 to the appropriate workload types using different techniques, such as machine-learning methods or ruled based methods. For example, the workload-classification component 132 may compare utilization by the workloads 118 for one or more dimensions of compute (e.g., CPU, GPU, memory, disk, and/or network throughput) with the resource-utilization models to identify closest match across the one or more dimensions of compute. The workload-classification component 132 may determine a workload type for the workloads 118 based on a comparison of the utilization data 134 with predefined models for the predefined workload types or categories where the utilization data 134 for each workload 118 may be mapped to the "closest" resource-utilization model of a predefined workload type or category.

After determining workload types for each of the workloads 118, the architecture-diagram engine 138 may obtain network traffic data 136 for the application architecture 126. The network traffic data 136 generally represents or indicates the traffic flow between components (e.g., workloads 118) of the application architecture. In some examples, the architecture-diagram engine 138 may identify the network traffic flowing between the workloads 118 and/or other components of the application architecture. Further, the architecture-diagram engine 138 may identify and analyze security groups associated with the workloads 118 and/or other components. The security groups for the different workloads 118, groups of workloads 118 of a same time, and/or other components of the application architecture 126 may provide security at the protocol and port access level. Each security group in the application architecture 126 may operate as a firewall in that they contain a set of rules that filter traffic coming into and out of a workload 118, workload group, and/or other component(s). The set of rules may permit particular data packets from being allowed to pass through the security firewall to a destination workload 118 (or another component). The rules of the security groups may include "inbound" and "outbound" rules that indicate what traffic is allowed to pass through the firewall to the workload 118 (inbound), and what traffic is allowed to leave the workload 118 to another workload 118 or component (outbound). In some instances, workloads 118 may permit certain types of inbound/outbound traffic, such as Secure Shell (SSH), Remote Desktop Protocol (RDP), HyperText Transfer Protocol (HTTP), and/or traffic communicated using other protocols.

It should be noted that the architecture-diagram engine 138 need not inspect data of the packets in the network traffic data 136. To protect the privacy of the users 110, the architecture-diagram engine 138 may simply understand the type (e.g., HTTP, RDP, SSH, etc.) of network traffic data 136 and/or the direction of flow, but not the contents (bytes or bits) of the data packets in the network traffic data 136.

Using the network traffic data 136, such as the type of traffic data, the direction of flow of the traffic data, the security groups of the different components and/or workloads 118, and/or other data, the architecture-diagram engine 138 may generate one or more architecture diagrams 142 that represent the application architecture 126. The architecture diagram(s) 142 may generally represent the workload types corresponding to the workloads 116 in the application architecture 126, as well as an indication of what workloads 118 and/or components have dependencies on each other. In some examples, the architecture diagram(s) 142 may include or be based on a dependency map that illustrates the dependencies of the workloads 118 on each other.

The architecture-diagram engine 138 may generate the architecture diagram(s) 142 by first indicating all of the different workload types for the different workloads 118 in the application architecture 126. Next, the architecture-diagram engine 138 may determine where the network traffic is flowing between the different workloads 118, and generate associations between the various workloads 118 that are communicating. The architecture diagram(s) 142 may represent the direction of the flow of network traffic between the workloads 118, and may further represent an amount of data flowing, a rate at which the data is flowing, a type of the data that is flowing, and/or other information. In this way, the architecture-diagram engine 138 may generate architecture diagram(s) 142 that generally describes relationships, such as dependencies, between workloads 118. Generally, the architecture diagram(s) 142 may comprise stored representations of the application architecture 126 that are mappings, associations, and/or other metadata stored in memory of the service provider network 102 that represent the application architecture 126. Further, the architecture-diagram engine 138 may analyze the infrastructure data 127 to determine the architecture diagram 142 for the application architecture 126. For instance, the architecture-diagram engine 138 may determine that the infrastructure data 127 indicates relationships between components, such as the workloads 118 of the application architecture 126. The architecture-diagram engine 138 may infer dependencies or relationships using the infrastructure data 127, such as identifying auto-scaling groups, security configurations/groups, load balancing configurations, and/or other infrastructure data 127 that can be used to infer relationships (e.g., dependencies) between workloads 118.

After generating the architecture diagram(s) 142, the optimization service 106 may compare the architecture diagram(s) 142 to one or more optimized architecture diagrams 144. Generally, the optimized architecture diagrams 144 may be architectural diagrams that are pre-generated, or pre-captured, and represent best practice designs for the application architectures to which each of the optimized architecture diagrams 144 correspond. The best practices according to which the optimized architecture diagrams 144 may include practices that reduce bottlenecks (e.g., tuning workloads, redundant workloads, etc.), help avoid availability ricks (e.g., having multiple availability zones), avoid single points of failure (e.g., increase fanning amongst workloads, migrate remote workloads 122 to be supported by the computing-resource network 112), and/or other best practices known in the art. In some examples, the service provider network 102 may determine best practices based on other users 110 application architectures 126 that also opted-in for use of the optimization service 106, and allowed the service provider network 102 to analyze the high-level application architecture 126.

The optimization service 106 may utilize various comparison techniques to compare the architecture diagram(s) 142 with the optimized architecture diagram(s) 144, such as pattern matching. For example, the optimization service 106 may perform pattern recognition for the architecture diagram(s) 142 and the optimized architecture diagrams 144 to identify various patterns, such as arrangements of workloads 118 and/or workload tiers, dependencies among the workload tiers, the number of workload tiers, and/or other patterns. In some examples, the architectural dependencies between the workloads 118 and/or workload tiers may indicate a particular, known architectural pattern for application architectures 126, such as a customer-facing web application. Generally, the optimization service 106 may use pattern matching to find an architectural design in the optimized architecture diagrams 144 that most closely matches the architecture diagram(s) 142 for the application architecture 126.

After matching the architecture diagram(s) 142 to a known, pre-created optimized architecture diagram 144, the optimization service 106 may make insights into the architecture diagram(s) 142, such as determining, at a high level, a type of the application architecture 126, labeling the architecture diagram(s) 142, and/or other insights. Further, the optimization service 106 may begin analyzing the architecture diagram(s) 142 and the optimized architecture diagrams 144 to determine differences between the diagrams. Generally, the differences between the architecture diagram(s) 142 and the optimized architecture diagram(s) 144 may indicate areas where the architecture diagram(s) 142 do not follow best practices, and may need to be modified, changed, or at least partially replaced by a new application architecture 126. The differences between the architecture diagram(s) 142 and the optimized architecture diagram 144 may be differences such as different numbers of workloads 118 in each workload tier, different numbers dependencies between workloads 118 and/or workload tiers, different types or configurations of workloads 118, different configuration/tuning parameters for the workloads 118, different locations at which workloads 118/122 are hosted (e.g., remote versus on the service provider network 104), and/or other differences that may affect the performance of an application architecture 126.

The recommendation engine 146 of the optimization service 106 may determine, at least partly based on the differences between the architecture diagram(s) 142 and the optimized architecture diagrams 144, one or more recommendations to provide to the user 110 associated with the application architecture 126. For example, the recommendation engine 146 may determine to recommend a change or modification to the application architecture 126 that brings the architecture diagram(s) 142 in-line with best practices. The recommendation engine 146 may determine to make a modification or change to the application architecture 126 to alleviate issues such as availability risks (e.g., single points of failure, single availability zones, etc.), bottlenecks reducing data-flow through the application architecture 126, inefficient or less optimized/configured workload types, remotely hosted workloads 122, and/or other undesirable characteristics in the application architecture 126. The recommendation engine 146 may generate recommendation data 150 that indicates the modification and/or changes recommended for the application architecture 126. In some examples, the recommendation engine 146 may further provide pre-created textual descriptions of why the modifications/changes are being recommended for the user 110 to view.

In some instances, the recommendation data 150 may include a recommendation to modify the application architecture 126 by entirely, or at least partially, migrating the entire application architecture 126 onto a new application platform that is optimized for the application type. In some examples, the recommendation data 150 may simply provide additional reading or background material for the user 110 to consider for their application architecture 126. In some instances, the recommendation data 150 may include a recommendation to modify the application architecture 126 by migrating a remote workload 122 from being hosted on remote computing resources 124 to be hosted, managed, or provided by the service provider network 102. For instance, the recommendation data 150 may indicate that the service provider network 102 supports workloads 118 that perform similar, or the same, functionality as the remote workload 122, and that consolidation of workloads is available which may reduce bottlenecks, reduce latency of transmission between networks, and/or provide other efficiencies. The recommendation data 150 may be provided to the user 110 via their user account that is accessible via the user portal(s) 130.

In some examples, the optimization service 106 may include a visualization component 140 that generates, using the architecture diagram(s) 142, a visualization of the end-to-end application architecture 126. In some examples, each of the workload types or categories are associated with, or mapped to, one or more graphical icons that represent the workload type. In this way, workloads 118 are mapped to the appropriate graphic icons or indicators for the visualization of the application architecture 126. Further, the dependencies may be indicated by lines, arrows, and/or any other graphic icon to indicate that data is flowing between workloads 118 and/or other components of the application architecture 126. The visualization component 140 may utilize the architecture diagram(s) 142 to generate visualization data 148 (e.g., image data, static images, video data, etc.) that, when presented on a display of a user device 108, visually depicts the application architecture 126. The optimization service 106 may provide the user device 108 with access to the visualization data 148 via, for example, a user portal(s) 130 that is accessible via an account of the user 110.

In some instances, the recommendation 150 may comprise text data, image data, and/or other data that may be combined with the visualization data 148 (e.g., overlaid) such that the user 110 may view recommendations included in the recommendation data 150 while they are viewing the visualization data 148 presented on the display of their user device 108. For instance, the recommendations in the recommendation data 150 may be presented on top of, and/or proximate to, images in the visualization data 148. Further description is found at least with reference to FIG. 5.

In some examples, an application architecture 126 may comprise or include a designated, and scalable, collection or grouping of computing resources (e.g., compute, memory, storage, networking, etc.) in the computing-resource network 112, and the code or logic that performs functionality using the computing resources. The service provider network 102 may support a wide variety of application architectures 126 comprises of various workloads 118.

Generally, the optimization service 106, and components thereof, may comprise software, firmware, and/or other logic that is supported one computing device, or across more computing devices in the service provider network 102.

Additionally, the optimization service 106 may comprise a system of other devices, such as software agents stored locally on VM instances 116.

Upon receiving the visualization data 148, the user device 108 may display, via a dashboard 152 associated with the user portal(s) 130, an architecture visualization 154 that represents the application architecture 126. As illustrated, the architecture visualization may include icons or other graphical indications of the different workload types, as well as dependencies, for the application architecture 126. Further detail regarding the architecture visualization 154 is described below with respect to at least FIGS. 3-5.

Figure 2:
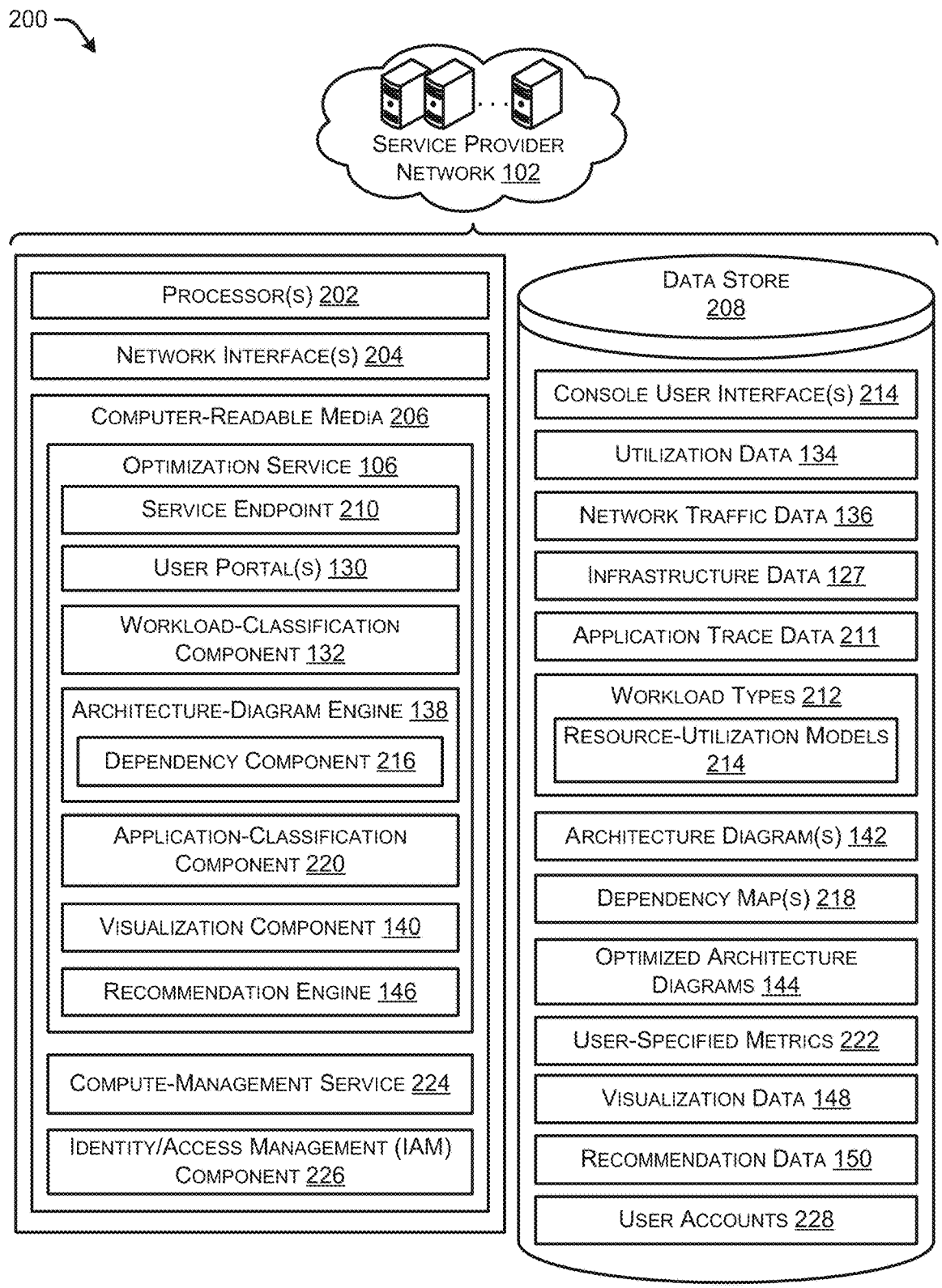
FIG. 2 illustrates a component diagram of example components of a service provider network that helps generate architecture diagrams representing applications, and use the architecture diagrams to determine recommendations to modify the application and generate visualizations of the application architecture.

FIG. 2 illustrates a component diagram 200 of example components of a service provider network 102 that helps generate architecture diagrams 142 representing applications, and use the architecture diagrams 142 to determine recommendations to modify the application and generate visualizations of the application architecture 126.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108, computing devices 114, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 106 described herein. For instance, the computer-readable media 206 may store a service endpoint 210 that may include a stack that supports internet routable APIs to describe, generate, delete, and make recommendations using resource-utilization data 138 or characteristics. Generally, this service stack of the service endpoint 210 may support APIs, CLI, consoles, SDKs, and/or any other function through which the components of the optimization service call, and/or the user devices 108.

The computer-readable media 206 may further store the user portal(s) 130 through which users 110 can provide input via their user accounts and user devices 108. In some examples, the user portal(s) 130 include an interface through which users 110 can upload user desired or specified performance metrics. Additionally, the user portal(s) 130 may include a web console which presents one or more console user interface(s) 214 (or UIs 214) through which the users 110 may access and view recommendation data 150 and/or visualization data 148. The service endpoint 210 may receive calls from APIs, CLIs, SDKs, and/or other electronic means or methods.

The computer-readable media 206 may further store components described above, such as the workload-classification component 132. In some examples, the workload-classification component 132 may be configured to determine workload types 212 for the different workloads 118. The workload-classification component 132 may determine one or more resource-utilization models 214 for each workload type 212 that represent the general "shape" or characteristics of the resource utilization by the workloads 136 represented by each workload type 212. That is, each workload type 212 may be associated with one or more resource-utilization models 214 that are generally representative of the resource consumption by workloads 136 in the workload type 212. The workload-classification component 132 may determine the resource-utilization models 214 using various methods, such as simulation techniques of different workloads 118 on VM instances 116, and/or using utilization data 134 for users 110 that have given permission for their application architectures to be analyzed at a high level without infringing on private data.

The workload-classification component 132 may, in some examples, be configured to generate the resource-utilization models 214 using various techniques, such as various ML algorithms, to train the resource-utilization models 214 that represent resource-utilization characteristics that are representative of the workloads 118 of each workload type 212. In this way, when a workload 118 needs to be categorized for purposes of generating an architecture diagram 142, the utilization data 134 for the workload 118 may be mapped to the resource-utilization model 214 that is "closest" or "most near" (e.g., neural network models) the fingerprint of the utilization data 134 for the workload 118. The workload-classification component 132 may utilize any type of ML algorithm or technique to train the resource-utilization models 214.

In some examples, the data store 208 may store application trace data 211 associated with application architectures 1126 for users 110. The application trace data 211 may be generated by a service associated with or provided by the service provider network 102 that provides users 110 with an end-to-end view of requests as they travel through the application architecture 126, and depicts or shows a map of the application architecture's 126 underlying components. For example, the trace service may generate the application trace data 211 by collecting data about requests from each of the underlying workloads 118 as the requests pass through the application architecture 126, record the application trace data 211 from each of the workloads 118 (or other components) into a log or other data structure, and provide a service map to indicate the application trace data 211 such as latencies, HTTP statuses, and metadata for each workload 118 (and/or other components or services).

The computer-readable media 206 may further store a dependency component 216, which may be part of the architecture-diagram engine 138, configured to determine dependency map(s) 218 for the application architectures 126 of users who have opted-in for the optimization service 106. As described above, the dependency map(s) 218 may indicate dependencies for the workloads 118 and/or other components of the application architecture 126. The architecture-diagram engine 138 may utilize the utilization data 134, network traffic data 136, dependency map(s) 218, and/or workload types 212 to generate or determine architecture diagram(s) 142 for the application architecture 126. A dependency map 218 may show various physical information such as the actual physical set of VM instances 116 in an application architecture 126, how the VM instances 116 relate to a load balancer, how traffic flows between the VM instances 116, how security groups are modeled across VM instances 116, how the VM instances 116 relate to each other, and/or other information. The dependency maps 218 may be a real, physical view of the application architecture 126. Using the dependency maps 218, the architecture-diagram engine 138 may infer or generate an architectural pattern in order to generate the architecture diagrams 142. The architecture diagrams 142 may be abstract versions of the dependency maps 218 in that they illustrate, for example, workload tiers without presenting specific information about the physical workloads 118 of the application architecture 126. Generally, the architecture diagrams 142 may be a JSON file (or other description language) that is in a format usable to find patterns as described below.

The application trace data 211 may be captured from the processes running on each VM instance 116 for use in debugging the application architecture 126. The application trace data 211 may indicate various insights regarding the application architecture 126, such as areas of failure, hotspots, and may be generated using a log trace, for example. The application trace data 211 may be utilized to generate the architecture diagrams 142, and/or determine recommendations. For instance, the application trace data 211 may indicate an area of failure that needs to be alleviated by, for instance, having redundant workloads 118 rather than a single workload 118.

The computer-readable media 206 may further store an application-classification component 220 configured to classify an application architecture 126, or determine a type of application that is supported by the application architecture 126. In some examples, the application-classification component 220 may compare an architecture diagram 142 with one or more optimized architecture diagrams 144 to determine to which of the optimized architecture diagram(s) 144 the architecture diagram 142 matches closest. For instance, the application-classification component 220 may utilize various comparison techniques to compare the architecture diagram(s) 142 with the optimized architecture diagram(s) 144, such as pattern matching. The application-classification component 220 may perform pattern recognition for the architecture diagram(s) 142 and the optimized architecture diagrams 144 to identify various patterns, such as arrangements of workloads 118 and/or workload tiers, dependencies among the workload tiers, the number of workload tiers, and/or other patterns. In some examples, the architectural dependencies between the workloads 118 and/or workload tiers may indicate a particular, known architectural pattern for application architectures 126, such as a customer-facing web application. Generally, the application-classification component 220 may use pattern matching to find an architectural design in the optimized architecture diagrams 144 that most closely matches the architecture diagram(s) 142 for the application architecture 126. The architecture diagrams 144 and optimized application architecture diagrams 144 may be files that are in formats usable for pattern matching, such as JSON, YAML, and so forth. The application-classification component 220 may utilize machine-learning techniques to perform pattern recognition, such as by using ML techniques to look for patterns for similar architectures when comparing the architecture diagrams 142 with the optimized architecture diagrams 144.

The computer-readable media 206 may further store the visualization component 140 and recommendation engine 146 described above. In some examples, the data store 208 may store user-specified metrics 222 for users 110 of the service provider network 102. The optimization service 102 may further provide recommendations in the recommendation data 150, and/or indicate portions of the visualization data 148 representing the architecture diagram 142 resulting in inefficiencies, based on the user-specified metrics 222. In this way, user-specified metrics 222 or goals can drive optimization of the application architecture 126. For instance, a user 110 may require or provide input indicating that the compute platform of their application achieve no less than 300 units produced per second, and no more than 1,000 units produced per second. Using reinforcement techniques, and/or machine-learning approaches, the optimization service 106 may determine recommendations for the application architecture 126 selection to achieve the user-specified metrics 222 or optimization goals. For example, if the user inputs metrics indicating they want latency for request/response for the application to be less than 700 milliseconds (ms), the optimization service 106 can use machine-learning techniques to determine what resource metrics impact latency, and may determine hardware/scaling recommendations for the application architecture accordingly. Users may then measure the success of the application architecture 126 based on the number of units produced. In some instance, recommendations to modify an application architecture 126 may include recommendations to migrate the application from a current architecture into a different, more optimized architecture.

The computer-readable media 206 may further store code for a compute-management service 224, which may be implemented by one, or multiple, computing devices 114 of the service provider network 102. Generally, the compute-management service 224 may be a service of the service provider network 102 that provides secure, resizable compute capacity and manages the computing resources of the computing-resource network 112. In some examples, the compute-management service 224 may perform various functions for managing the computing-resource network 112, such as provisioning VM instances 116, migrating workloads 118 between VM instances 116, providing auto-scaling for fleets of VM instances 116, configuring VM instances 116 and/or workloads 118, and/or performing any other functions for managing the computing-resource network 112. In some instances, the compute-management service 224 may receive commands from the optimization service 106 for managing the workloads 118 and/or VM instances 116 for users 110 of the service provider network 102.

In some examples, the compute-management service 224 may include an auto-scaling component that, when executed by the processor(s) 202, scales up or down the number of instances 116 available to support one or more workloads 118. For example, the auto-scaling component may provide a fast, efficient, and accurate way to match fleet capacity to usage. In some examples, the auto-scaling component may track the fleet's hosting metrics and determine when to add or remove instances 116 based on a set of guidelines, called policies. The auto-scaling component can adjust capacity in response to changes in demand to help ensure that the fleet of instances 116 has availability for bursts without maintaining an excessive amount of idle resources.

To utilize the services provided by the service provider network 102, users 110 may register for an account with the service provider network 102. For instance, users 110 may utilize a user device 108 to interact with an identity and access management (IAM) component 226 that allows the users 110 to create user accounts 228 with the service provider network 102. Generally, the IAM component 226 may enable the users 110 to manage their workloads 118 and other computing resources securely. Using the IAM component 226, the users 110 may manage their VM instances 116, workloads 118, and/or application architectures 126 as described herein. Additionally, users 110 may perform various operations for interacting with the optimization service 106 via their user accounts 228, such as receiving/viewing recommendation data 132, receiving/viewing visualization data 148, inputting user-specified metrics 226, and/or other interactions may be authorized via credentials required to access the user accounts 228.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
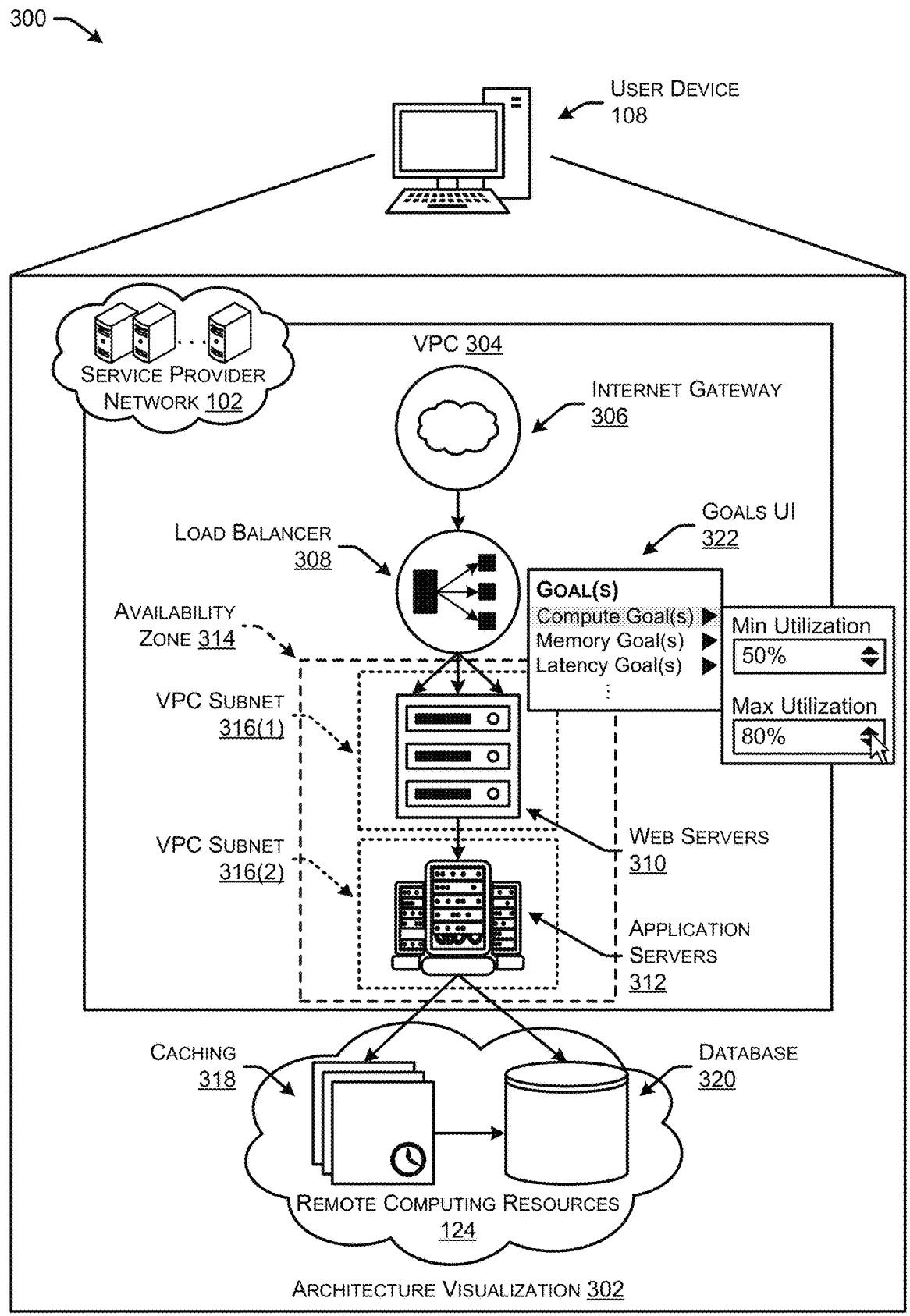
FIG. 3 illustrates a graphical user interface that includes an architecture visualization that depicts an application architecture for a user of the service provider network.

FIG. 3 illustrates a graphical user interface 300 that is presented on a display of a user device 108 and includes an architecture visualization 302 that depicts an application architecture 126 for a user account 228 of a user 110 of the service provider network 102.

The architecture visualization 302 may generally comprise image data, and/or video data, included in visualization data 148 that has been generated using an architecture diagram 142. The architecture visualization 302 depicts components and workload types 212 for an application architecture 126.

As illustrated in the architecture visualization 302, a service provider network 102, may have created a virtual private cloud (VPC) 304 for the user account 228 that hosts or supports at least a portion of the application architecture 126 for the user account 228. Generally, the VPN 304 may be created and managed by the service provider network 102 and provides the user 110 with a safe, isolated, and encrypted connection over a less secure network (e.g., the Internet). As illustrated the VPC 304 may include an internet gateway 306 that may comprise a redundant VPC component that allows communication between instances in the VPC 304 and the internet. In some examples, the internet gateway 206 provides a target for internet-routable traffic, and performs network address translation (NAT) for instances that have been assigned public IPv4 addresses.

The VPC 304 may further include a load balancer 308 which may serve as a point of contact for user devices 108 and distributes incoming traffic across multiple targets, such as web servers 310 running on VM instances 116. The web servers 310 may comprise a web tier of the application architecture 126 and receive balanced external traffic from the load balancer 308. The web servers 310 may be scalable by an auto scaling group and monitor demand from the user devices 108 to pass requests onto application servers 312. Generally, the application servers 312 may perform logic or code that implements functionality of the application architecture 126, such as business logic defined or provided by a user 110.

As illustrated, the web servers 310 are in a first VPC subnet 316(1), and the application servers 312 are in a second VPC subnet 316(2). The VPC subnets 316 may behave similar to firewalls and be associated with the security groups described above. That is, the VPC subnets 316 may define security policies that are used to determine the security groups (e.g., part of the network traffic data 136). Further, the architecture visualization 302 may indicate that a single availability zone 314 is utilized for the web servers 310 and applications servers 312. Generally, an availability zone 314 may comprise an isolated location in which workloads 118 may be placed such that availability of workloads 118 are not placed in a single location. In this way, is a failure occurs in one availability zone 314, a different availability zone 314 will not be affected by the failure.

As further illustrated in the architecture visualization 302, remote computing resources 124 may be utilized to host at least one caching workload 318, as well a database workload 320. That is, the user 110 themselves, or another service network, may be managing the remote computing resources 124 that host a caching workload 318 and a database workload 320. In this way, the architectural visualization 302 may present components and workloads 118 of an application architecture 126 to be viewed by a user 110 of a user device 108.

In some examples, the architecture visualization 302 may further allow a user 110 to interact with areas presented on the user device 108 to input information, such as the user-specified metrics 222. In some examples, the user 110 may provide input (e.g., click of a mouse, hovering of a cursor, keystroke, etc.) at an area of the architecture visualization 302, such as an icon representing the workload 118 of the web servers 310. The user 110 may be presented with a goals user interface (UI) 322. The goals UI 322 may allow the user 110 to provide input to specify an optimization goal for the web servers 310, such as a compute goal, memory goal, latency goal, etc., indicating a desired performance for the web servers 310. In the illustrated example, the user 110 has indicated they would like to specific compute goals for the web servers 310 such that the minimum utilization of the underlying VM instances 116 for the workloads 118 does not drop below 50%, but the maximum utilization of the VM instances 116 does not exceed 80%. In this way, the user 110 can input their user-specific metrics 222 that may be utilized by the optimization service 106 to provide recommendations, as described in more detail in FIG. 5.

It should be noted that the architectural visualization 302 is merely illustrative and any type of architectural visualization 302, graphic icons, and/or other visual data may be used to visually depict an application architecture 126 according to the techniques described herein.

Figure 4:
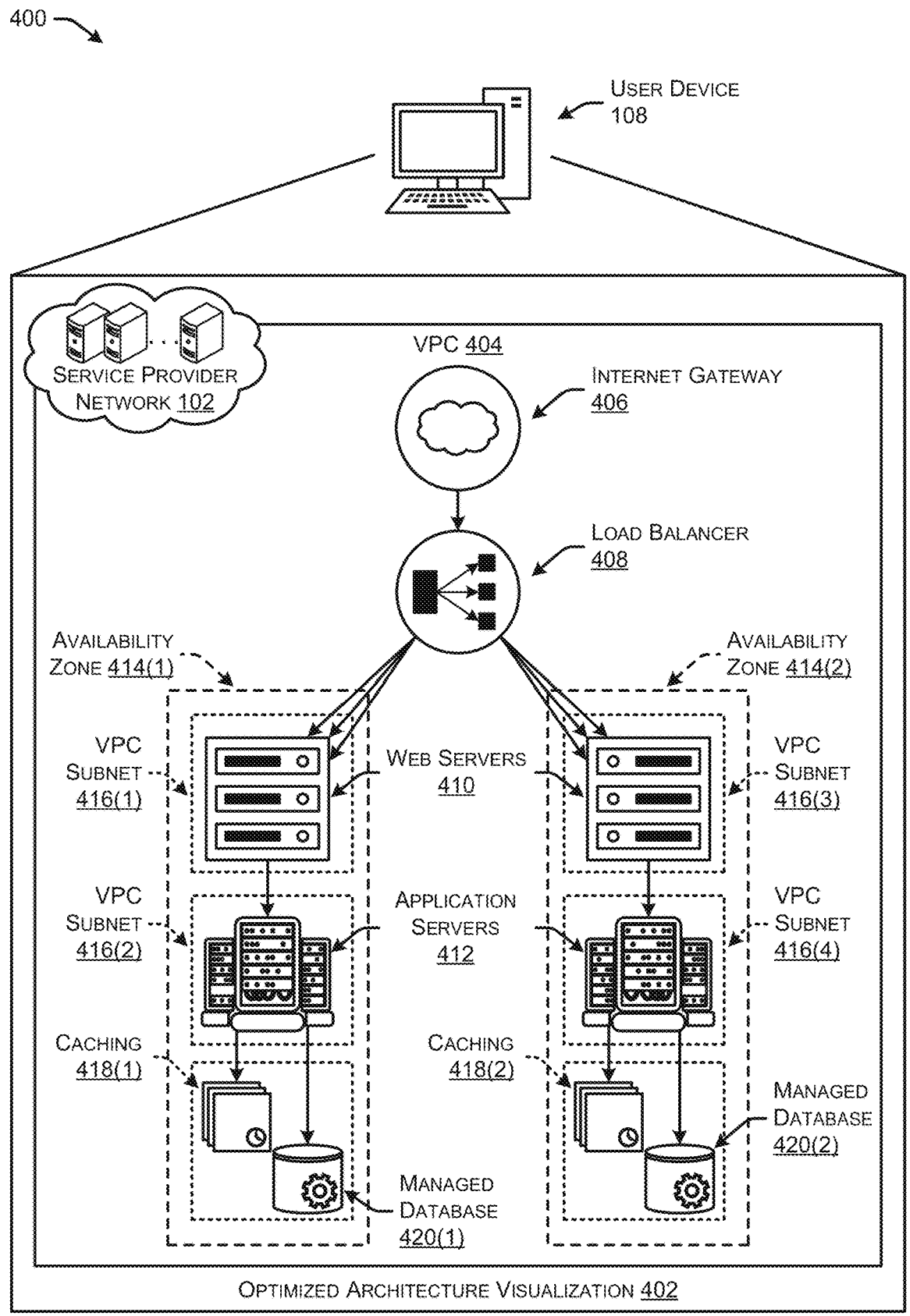
FIG. 4. illustrates a graphical user interface that includes an optimized architecture visualization that depicts an application architecture that is in-line with best practices for the application.

FIG. 4. illustrates a graphical user interface 400 that includes an optimized architecture visualization 402 that depicts an optimized application architecture 126 that is in-line with best practices for the corresponding application.

As shown in the optimized architecture visualization 402, the optimized application architecture 126 may comprise multiple availability zones 414(1) and 414(2), rather than a single availability zone 314 as shown in the architecture visualization 302. Further, the optimized architecture visualization 402 illustrates that an optimized architecture application 126 has multiple managed databases 420(1) and 420(2), rather than a single database 320. The managed databases 420 may be part of a service provided by the service provider network 102 and be managed by the service provider 104 and supported/hosted in the service provider network 102. Finally, the optimized architecture visualization 402 illustrates that the caching 418 as well as the managed databases 420 are included in the VPC 404 that is managed by the service provider network 102, as opposed to the caching 318 and database 320 that are hosted on remote computing resources 124. Thus, the user 110 may have indicated that the service provider network 102 is to utilize a cloud service to provide the managed databases 420 rather than using remote computing resources 124 to host the potentially unmanaged database 320.

FIG. 5 illustrates a diagram 500 of an example data flow where an optimization service 106 provides a user device 108 with image data representing a visualization 302 of an architecture diagram 142 for an application, and the user device 108 presents the visualization 302 of the architecture diagram 142 along with recommendations 502 and 504 for modifying the application architecture 126.

As illustrated, the architecture diagram 142 may be generated and provided to the application-classification component 220 along with one or more optimized architecture diagrams 144. The application-classification component 220 may determine to which of the optimized architecture diagrams 144 that the architecture diagram 142 matches/corresponds closest, and determine differences between the architecture diagram 142 and the corresponding optimized architecture diagram 144. The application-classification component 220 may then pass data indicating those differences to the recommendation engine 146, which determines modifications or changes to make to the application architecture 126 that is represented by the architecture diagram 142. The recommendation engine 146 may generate and send/transmit recommendation data 150 to the user device, where the recommendation data 150 includes recommendations that the changes/modifications be made to the application architecture 126 represented by the architecture diagram 142.

Further, the architecture diagram 142 may be provided to the visualization component 140, which generates visualization data 148 that, when presented on a display, visually depicts or illustrates the application architecture 126. The visualization data 148 is then sent/transmitted or otherwise provided to the user device 108.

The user device 108 may present the visualization data 148 on a display, where the visualization data 148 represents or defines the architecture visualization 302 shown on the display of the user device 108. In some examples, the recommendation data 150 may further be presented on the display of the user device 108 to highlight or otherwise visually indicate the recommendations 502 and 504 made to the user 110. As illustrated, the recommendation 502 may indicate that a potential availability risk of having a single availability zone 314, and a recommendation 502 may be overlaid on the architecture visualization 302 that indicates the user 110 might consider multiple availability zones. Further, the recommendation 504 may indicate that the database 320 might have a point of failure in that it is a single database 320 that, if has issues, reduces in unavailability of the entire application. The recommendation 504 may suggest that the user consider a multi-master schema for their database to avoid a point of failure. Additionally, the database 320 may be an unmanaged database, and the recommendation may suggest that the user 110 consider migrating the database 320 to be a cloud-managed database that is managed in the service provider network 102. Further, the recommendation data 150 may include a recommendation 506 that the user 110 consider a virtual machine instance 116 with a larger amount of compute to meet an optimization goal of the user 110. As illustrated in FIG. 3, the user 110 may have provided user-specified metrics 222 that indicate a compute optimization goal. The VM instance type supporting the web servers 310 may be undersized, or oversized, based on the specified optimization goals, and the recommendation 506 may indicate that the user 110 can select a more appropriate VM instance type to support their web servers 310 to meet their optimization goals.

FIGS. 6A, 6B, 7, and 8 illustrate flow diagrams of example methods 600, 700, and 800 that illustrate aspects of the functions performed at least partly by the service provider network 102 as described in this disclosure. The logical operations described herein with respect to FIGS. 6A, 6B, 7, and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, 7, and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of methods 600, 700, and/or 800 are performed using a system that includes a computing resource network 112 of a service provider network 102 that is managed by a service provider 104. The computing resource network 112 may be configured to support at least a first workload type 130 and a second workload type 130.

In some examples, the techniques of methods 600, 700, and/or 800 may be performed by an optimization service 106 that includes one or more processors 202 and one or more computer-readable media 206 storing computer-executable instructions that, when executed by the one or more processors, cause the one or more processors to perform the operations of the methods 600, 700, and/or 800. In some examples, a system (e.g., service provider network 102) performs various operations of methods 600, 700, and/or 800. The system may include a computing resource network 112 that is managed by the service provider 104, and includes hardware resources configured to support an application (e.g., application architecture 126) on behalf of a user account 228. In some examples, the application comprises or includes a first workload 118 comprising a first process executing on a first virtual resource, and a second workload 118 comprising a second process executing on a second virtual resource.

Figure 6A:
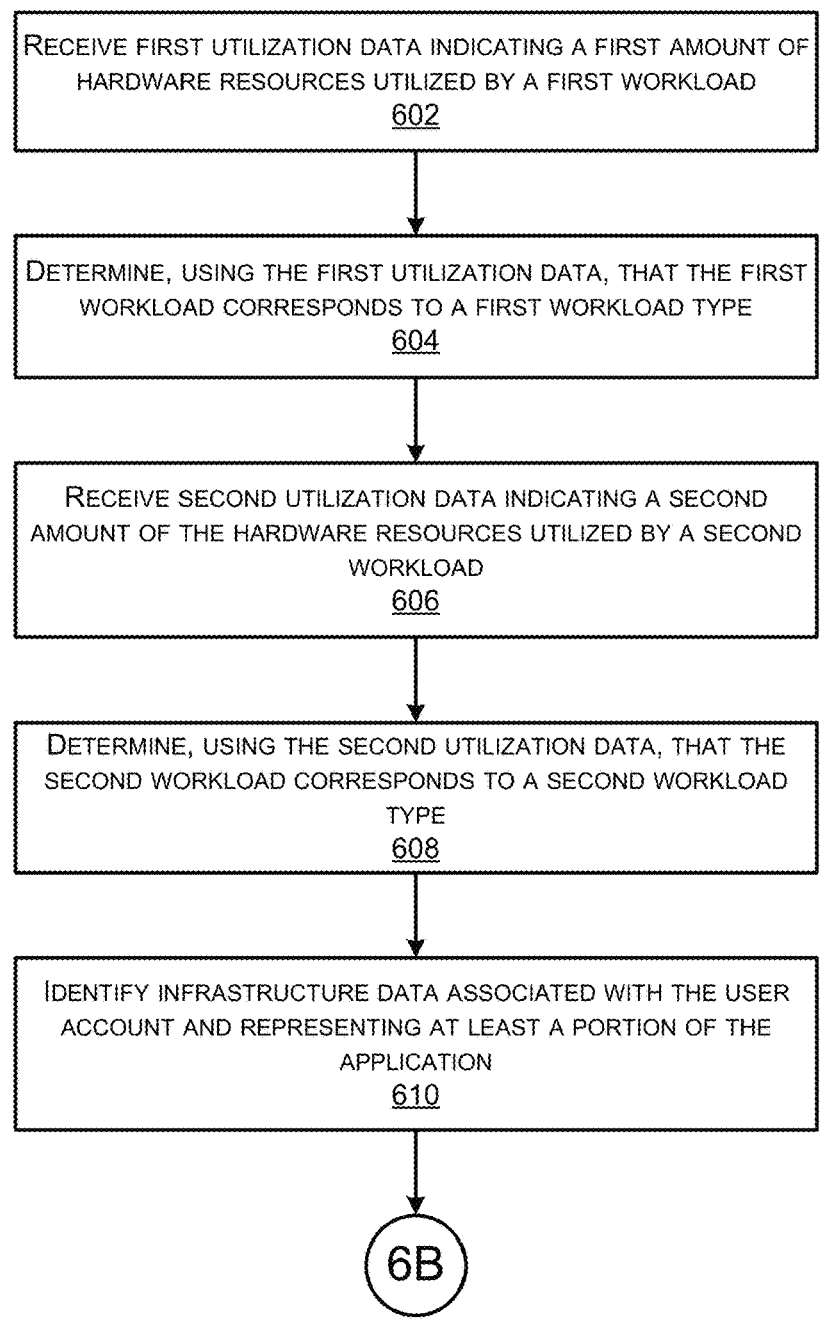

FIGS. 6A and 6B collectively illustrate a flow diagram of an example method for a service provider network 102 to identify workload types for workloads of an application, identify network traffic data indicating an amount of data flowing between workloads, generate an architecture diagram that corresponds to an optimized architecture diagram, determine a modification for the application, and provide recommendation data to a user account including a recommendation to make the modification to the application.

At 602, the optimization service 106 may receive first utilization data indicating a first amount of the hardware resources utilized by the first workload. At 604, the optimization service 106 may determine, using the first utilization data, that the first workload 118 corresponds to a first workload type 212. At 606, the optimization service 106 may receive second utilization data 134 indicating a second amount of the hardware resources utilized by the second workload 118. For instance, the agent 120 executing on the first and second workloads 118 may collect and provide the utilization data 134 to the optimization service 106, where the utilization data 134 indicates amounts and/or combinations of underlying resource usage by the VM instances 116 and/or workloads 118 (e.g., utilization of CPU, memory, disk, network, GPU, etc.). At 608, the optimization service 106 may determine, using the second utilization data 134, that the second workload 118 corresponds to a second workload type 212. To determine that the first and second workload 118 correspond to the first and second workload types 212, the optimization service 106 may map the first and second utilization data 134 to first and second resource-utilization models 214 associated with the respective first and second workload types 212.

At 610, the optimization service 106 may identify infrastructure data 127 associated with the user account 228 and representing at least a portion the application. For instance, a user 110 of the user account 228 may have provided an infrastructure templates or description that indicates the computing resources and configuration settings for the application architecture 126. The infrastructure template may comprise a file (for example, a JavaScript Object Notation (JSON) or YAML-formatted text file) that describes the computing resources and associated configuration settings used to implement a computing resource stack, along with descriptions of interconnections among the resources. The infrastructure data 127 may comprise metadata that describes the virtual infrastructure of the application architecture 126 in the cloud, such as security groups for the different workloads or components, load-balancing configurations, auto-scaling groups, and/or other infrastructure data that comprises the virtual infrastructure of the application hosted in the service provider network.

At 612, the optimization service 106 may determine, using the infrastructure data 127, that the first workload 118 has a dependency on the second workload 118. As an example, a security group for the second workload 118 may indicate that the first workload 118 is a permitted source for network communication data. In this way, security groups (and other infrastructure data 127) may indicate dependencies and relationships between workloads 118 and other components. For instance, the infrastructure data 127 may indicate that the first workload 118 is a load balancer, and that the second workload 118 is part of an auto-scaling group, indicating that the first workload 118 may pass network traffic data/packets to the second workload 118.

At 614, the optimization service 106 may generate an architecture diagram 142 that represents the application, the architecture diagram 148 representing at least the first workload type 212 having the dependency on the second workload type 212. At 616, the optimization service 106 may determine that the architecture diagram 142 corresponds to an optimized architecture diagram 144, the optimized architecture diagram 144 representing an architecture that is optimized to support the application. For example, the optimization service 106 may preform pattern matching between files that represent the architecture diagram 142 and the optimized architecture diagram 144 (e.g., JSON files, YAML files, etc.) to determine that the architecture diagram 142 corresponds, or matches, most strongly to a particular optimized architecture diagram 144.

At 618, the optimization service 106 may analyze the optimized architecture diagram 144 and the architecture diagram 142 to determine a modification for the application. For instance, the optimization service 106 may determine that the architecture diagram 142 differs from the optimized architecture diagram 144, and determine that the difference violates best practices indicated by the optimized architecture diagram 144. The optimization service 106 may then determine a modification that remedies or alleviates the difference to bring the architecture diagram 142 "in-line" with best practices (e.g., multi-master database schema, additional availability zones, resizing VM instances, migrating portions or all of an application architecture 126 to a cloud-managed service in the service provider network, etc.).

At 620, the optimization service 106 may provide, to the user account, recommendation data including a recommendation to make the modification to the application.

In some examples, the method 600 may further include generating a virtual visualization of the architecture diagram 142 that represents the application, and providing the user account 228 with access to a user interface (e.g., architecture visualization 302) that depicts the virtual visualization of the architecture diagram 142. In some examples, the user device 108 may be running a web browser that has a client running in it that renders or presents the architecture visualization, the optimized architecture visualization 402, and/or the recommendation data 148 (e.g., recommendations 502, 504, and/or 506). In such examples, the client running in the web browser may receive the architecture diagram 142 and/or optimized architecture diagram 144 and use the JSON and/or YAML files to render the architecture visualization 302, the optimized architecture visualization 402, and/or the recommendation data 148 on a display of the user device 108.

FIG. 7 illustrates a flow diagram of an example method for a service provider network to generate an architecture diagram for an application that corresponds to an optimized architecture diagram, determine a difference between the architecture diagrams, and provide recommendation data to a user account including a recommendation to make a change to the application.

At 702, the optimization service 106 may host, at least partly by a service provider network, an application on behalf of a user account registered with the service provider network. In some examples, the application comprises a first workload and a second workload.

At 704, the optimization service 106 may identify a first workload type associated with the first workload, and at 706, the optimization service 106 may identify a second workload type associated with the second workload.

At 708, the optimization service 106 may identify infrastructure data associated with the user account and representing at least a portion the application. At 710, the optimization service 106 may determine an architecture diagram that represents the application, wherein the architecture diagram representing the first workload type having a dependency on the second workload type. At 712, the optimization service 106 may determine a difference between the architecture diagram and an optimized architecture diagram, the optimized architecture diagram representing an application architecture that is optimized to support the application. At 714, the optimization service 106 may provide, to a client device associated with the user account, recommendation data indicating a change determined for the application based at least in part on the difference.

In some examples, the method 700 may further include identifying network communication data flowing between the first workload and the second workload in the service provider network, determining that a rate at which the network communication data is flowing is less than a threshold rate, identifying, at least partly using the architecture diagram, a component of the application that is limiting the rate at which the network communication data is flowing, the component including at least one of the first workload or the second workload, and determining the change to at least one of replace or modify the component of the application.

Figure 8:
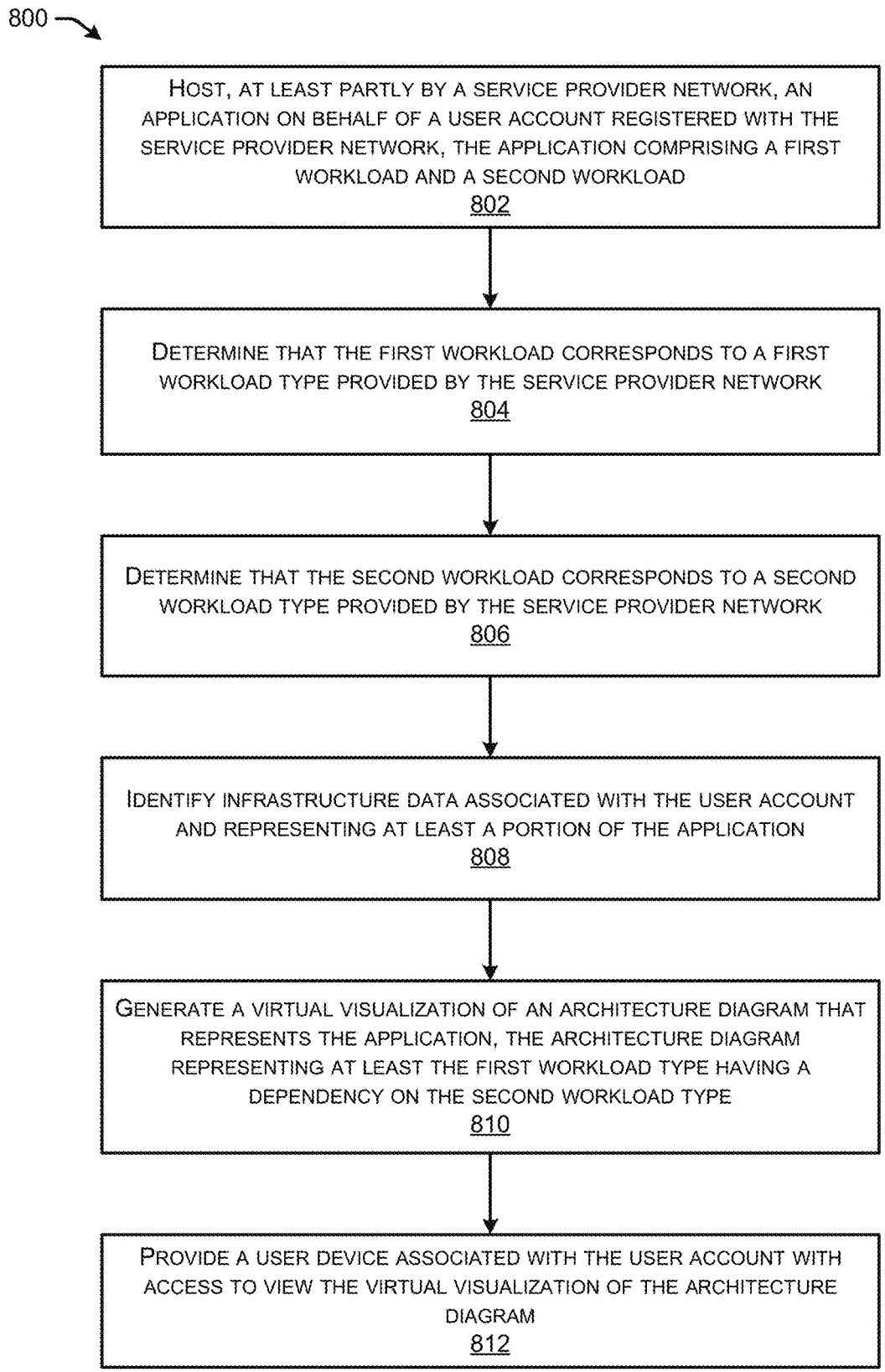
FIG. 8 illustrates a flow diagram of an example method for a service provider network to identify workloads in an application, generate a virtual visualization of an architecture diagram that represents the application, and provide a user device with access to view the virtual visualization of the architecture diagram.

FIG. 8 illustrates a flow diagram of an example method for a service provider network to identify workloads in an application, generate a virtual visualization of an architecture diagram that represents the application, and provide a user device with access to view the virtual visualization of the architecture diagram.

At 802, the optimization service 106 may host, at least partly by a service provider network, an application on behalf of a user account registered with the service provider network, wherein the application comprises a first workload and a second workload.

At 804, the optimization service 106 may determine that the first workload corresponds to a first workload type provided by the service provider network. At 806, the optimization service 106 may determine that the second workload corresponds to a second workload type provided by the service provider network. At 808, the optimization service 106 may identify infrastructure data associated with the user account and representing at least a portion of the application. At 810, the optimization service 106 may generate a virtual visualization of an architecture diagram that represents the application, wherein the architecture diagram representing at least the first workload type having a dependency on the second workload type. At 812, the optimization service 106 may provide a user device associated with the user account with access to view the virtual visualization of the architecture diagram.

Figure 9:
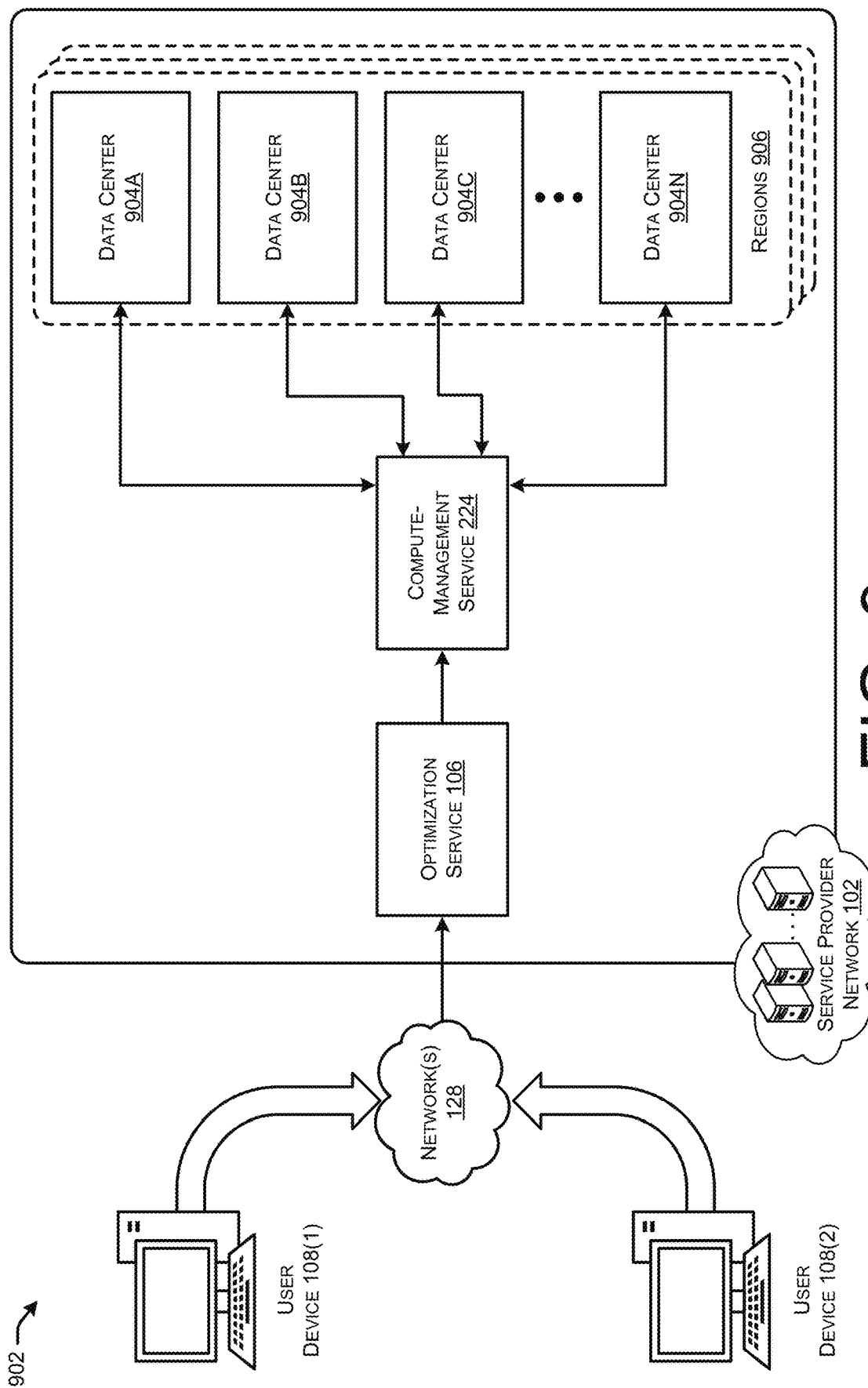
FIG. 9 is a system and network diagram that shows an illustrative operating environment that includes data centers of a service provider network that can be configured to implement aspects of the functionality described herein.

FIG. 9 is a system and network diagram that shows an illustrative operating environment that includes data centers a service provider network 102 that can be configured to implement aspects of the functionality described herein. The service provider network 102 can provide computing resources, like VM instances and storage, on a permanent or an as-needed basis. Among other types of functionality, the computing-resource network 112 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations, or regions 906. One illustrative embodiment for a data center 904 that can be utilized to implement the technologies disclosed herein will be described below with regard to FIG. 10.

The users 110 of the user devices 108 that utilize the service provider network 102 may access the computing resources provided by the service provider network 102 over any wired and/or wireless network(s) 128, which can be a wide area communication network ("WAN"), such as the Internet, an intranet or an Internet service provider ("ISP") network or a combination of such networks. For example, and without limitation, a user device 108 operated by a user 110 of the service provider network 102 may be utilized to access the service provider network 102 by way of the network(s) 128. It should be appreciated that a local-area network ("LAN"), the Internet, or any other networking topology known in the art that connects the data centers 904 to remote clients and other users can be utilized. It should also be appreciated that combinations of such networks can also be utilized.

Figure 10:
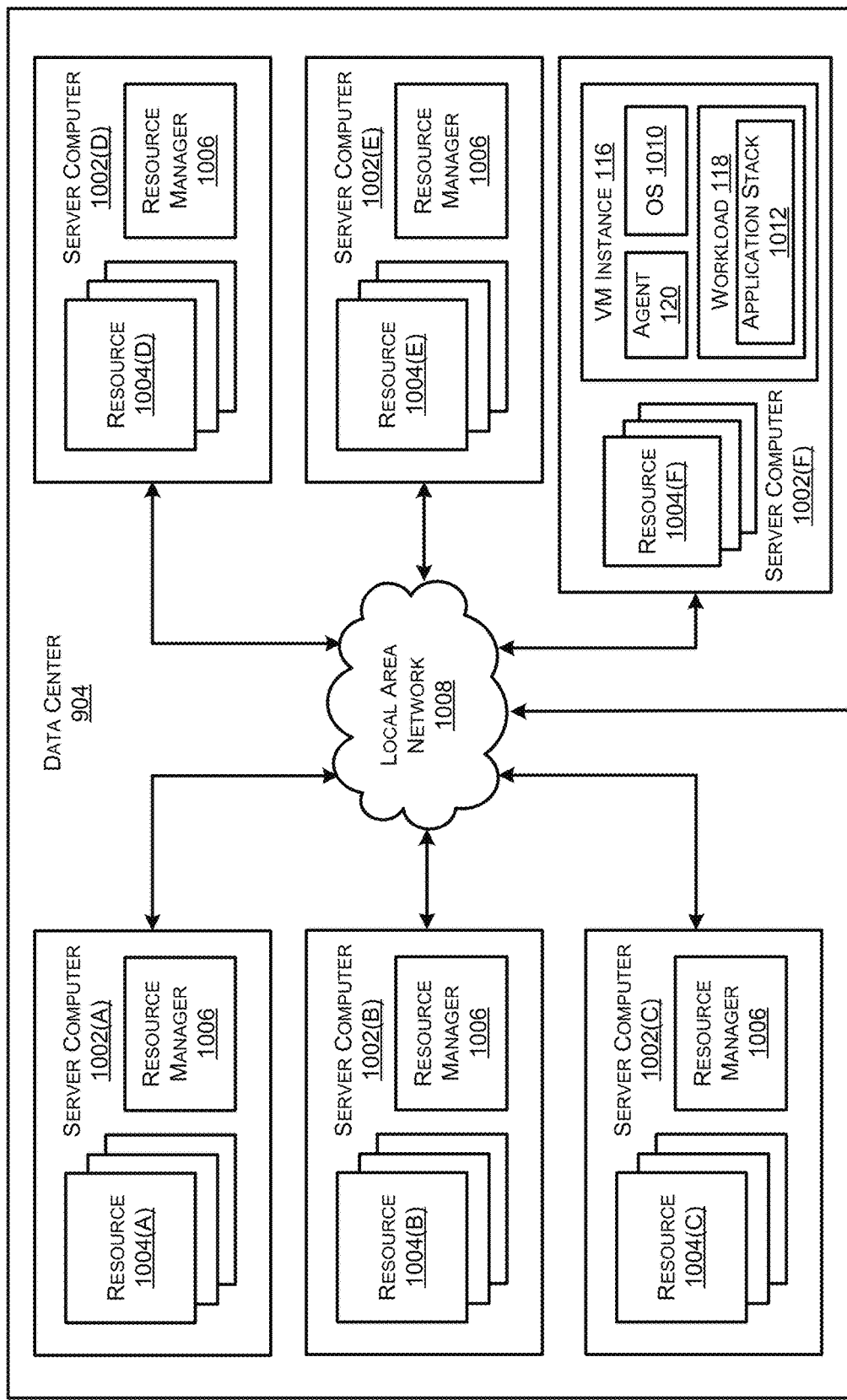
FIG. 10 is a computing system diagram illustrating a configuration for a data center that can be utilized to implement aspects of the technologies disclosed herein.

FIG. 10 is a computing system diagram 1000 that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the computing devices 114 described herein.

The server computers 1002 can be standard tower, rackmount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 904 can also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations can be utilized.

The data center 904 shown in FIG. 10 also includes a server computer 1002F that can execute some or all of the software components described above. For example, and without limitation, the server computer 1002F (and the other server computers 1002) can generally be included in to the computing devices 114 of FIG. 1 and be configured to execute components, including the components of the optimization service 106, the computing-resource network 112, and/or the other software components described above. The server computer 1002F can also be configured to execute other components and/or to store data for providing some or all of the functionality described herein. In this regard, it should be appreciated that the services illustrated in FIG. 10 as executing on the server computer 1002F can execute on many other physical or virtual servers in the data centers 1004 in various embodiments. For example, the server computer 1002F may support or host a CM instance 116 that runs an agent 120, an operating system 1010, and a workload 118 (e.g., process(es)) that comprises an application stack 1012 for performing functionality of any workload 118 as described herein, or otherwise known in the art.

Figure 11:
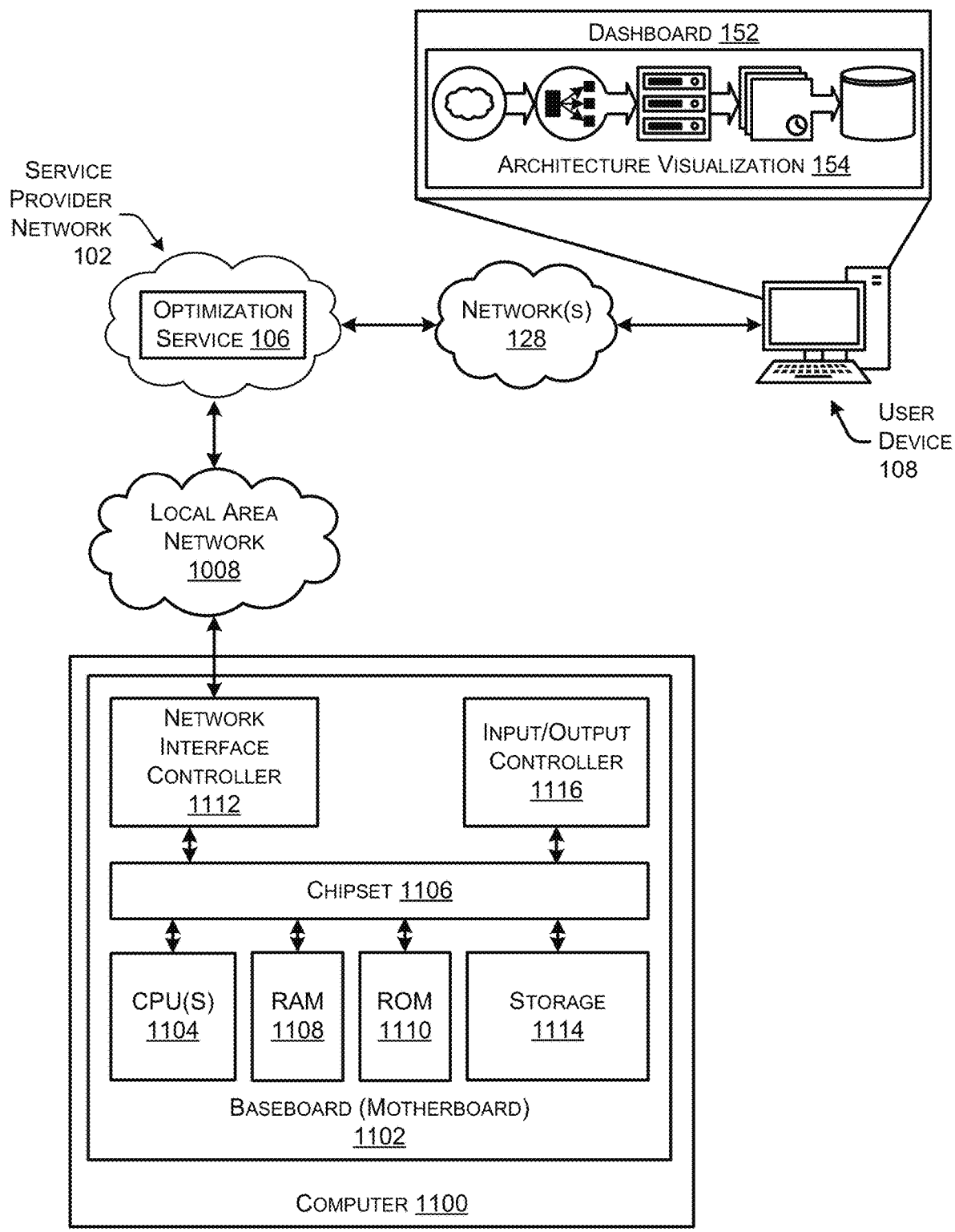
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. In some examples, the server computer 1100 may correspond to, or be the same as or similar to, a computing device 114 described in FIG. 1.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1008. The chipset 1106 can include functionality for providing network connectivity through a network interface controller (NIC) 1112, such as a gigabit Ethernet adapter. The NIC 1112 is capable of connecting the computer 1100 to other computing devices over the network 1008. It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

Generally, the computer 1100 may be an example of a computing device 114 (and other computing devices, servers, etc.) described herein. The CPU(s) 1104, RAM 1108, ROM 1110, storage 1114, bandwidth of the NIC 1112, and/or other resources of the computer 1100 may be allocated to one or more different VM instances 116 as described herein based on the VM instance types.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
a computing resource network associated with a service provider network that is managed by a service provider, the computing resource network including hardware resources configured to support an application on behalf of a user account, the application comprising:
 a first workload comprising a first process executing on a first virtual resource; and
 a second workload comprising a second process executing on a second virtual resource;
one or more processors; and
one or more computer-readable media storing computer-executable instructions that, when executed by the one or more processors, cause the one or more processors to:
 receive, at a computing system associated with the service provider network, first utilization data indicating a first amount of the hardware resources utilized by the first workload;
 determine, by the computing system and using the first utilization data, that the first workload corresponds to a first workload type;
 receive, at the computing system, second utilization data indicating a second amount of the hardware resources utilized by the second workload;
 determine, by the computing system and using the second utilization data, that the second workload corresponds to a second workload type;
 identify, by the computing system, infrastructure data associated with the user account and representing at least a portion the application;
 determine, by the computing system and using the infrastructure data, that the first workload has a dependency on the second workload;
 generate, by the computing system, an architecture diagram that represents the application, the architecture diagram representing at least the first workload type having the dependency on the second workload type;

determine, by the computing system, that a first architectural pattern of the architecture diagram corresponds to a second architectural pattern of an optimized architecture diagram, the optimized architecture diagram representing an architecture that is optimized to support the application;

analyze, by the computing system, the optimized architecture diagram and the architecture diagram to determine a modification for the application; and provide, from the computing system and to the user account, recommendation data including a recommendation to make the modification to the application.

2. The system of claim 1, comprising further computer-executable instructions that, when executed, cause the one or more processors to:

generate a virtual visualization of the architecture diagram that represents the application; and provide the user account with access to a user interface that depicts the virtual visualization of the architecture diagram.

3. The system of claim 1, wherein analyzing the optimized architecture diagram and the architecture diagram to determine the modification for the application comprises:

identifying, using the architecture diagram, an availability risk associated with the dependency that the first workload has on the second workload; and determining, using the optimized architecture diagram, the modification to remedy the availability risk.

4. The system of claim 1, wherein:

analyzing the optimized architecture diagram and the architecture diagram to determine the modification for the application comprises:

determining that a third workload supporting the application is supported by remote hardware resources; and determining that the third workload corresponds to a third workload type that is supported by the hardware resources of the computing resource network associated with the service provider network; and the recommendation to make the modification comprises recommending that the third workload be supported by the hardware resources of the computing resource network.

5. The system of claim 1, wherein:

to determine that the first architectural pattern of the architecture diagram corresponds to the second architectural pattern of the optimized architecture diagram includes determining that the optimized architecture diagram represents at least the first workload type having the dependency on the second workload type; and to analyze the optimized architecture diagram and the architecture diagram to determine a modification for the application includes identifying a difference between the first architectural pattern of the architecture diagram and the second architectural pattern of the optimized architecture diagram.

6. A computer-implemented method comprising:

hosting, at least partly by a service provider network, an application on behalf of a user account registered with the service provider network, the application comprising a first workload and a second workload;

identifying, by a computing system associated with the service provider network, a first workload type associated with the first workload;

identifying, by the computing system, a second workload type associated with the second workload;

identifying, by the computing system, infrastructure data associated with the user account and representing at least a portion the application;

determining, by the computing system and using the infrastructure data, an architecture diagram that represents the application, wherein the architecture diagram represents the first workload type as having a dependency on the second workload type;

determining, by the computing system, that a first architectural pattern of the architecture diagram at least partly corresponds to a second architectural pattern of an optimized architecture diagram, the optimized architecture diagram representing an application architecture that is optimized to support the application;

determining, by the computing system, a difference between the architecture diagram and the optimized architecture diagram; and providing, from the computing system and to a client device associated with the user account, recommendation data indicating a change determined for the application based at least in part on the difference.

7. The computer-implemented method of claim 6, further comprising:

identifying network communication data flowing between the first workload and the second workload in the service provider network;

determining that a rate at which the network communication data is flowing is less than a threshold rate;

identifying, at least partly using the architecture diagram, a component of the application that is limiting the rate at which the network communication data is flowing, the component including at least one of the first workload or the second workload; and determining the change to at least one of replace or modify the component of the application.

8. The computer-implemented method of claim 7, further comprising:

receiving, via the user account, a service goal indicating a desired latency associated with the application responding to a request; and determining the threshold rate at which the network communication data is to flow based at least in part on the desired latency.

9. The computer-implemented method of claim 6, wherein determining the difference between the architecture diagram and an optimized architecture diagram comprises:

determining that a third workload supporting the application is supported by remote hardware resources; and determining that the third workload corresponds to a third workload type that is provided by the service provider network, further comprising determining the change to the application to support the third workload using the service provider network.

10. The computer-implemented method of claim 6, further comprising:

determining that the first workload has a dependency on the second workload, wherein the architecture diagram represents the first workload type having the dependency on the second workload type.

11. The computer-implemented method of claim 6, further comprising:
   generating image data representing a virtual visualization of the architecture diagram; and
   providing the client device associated with the user account with access to the image data.

12. The computer-implemented method of claim 11, further comprising:
   identifying network communication data flowing between the first workload and the second workload in the service provider network;
   identifying, at least partly using the architecture diagram, a component of the application that is limiting a rate at which the network communication data is flowing,
   wherein the image data includes a virtual indication that the component of the application is limiting the rate at which the network communication data is flowing.

13. The computer-implemented method of claim 12, wherein the image data comprises first image data, and the change includes at least one of replacing or modifying the component of the application, further comprising:
   receiving, from the client device, input data indicating a user interaction associated with a portion of the first image data representing at least one of the virtual indication or the component,
   wherein providing the client device the recommendation data includes providing the client device with access to second image data that indicates the change to at least one of replace or modify the component of the application.

14. The computer-implemented method of claim 6, further comprising:
   identifying, at least partly using the architecture diagram, an availability risk associated with the application; and
   determining, at least partly using the optimized architecture diagram, the change for the application that remedies the availability risk.

15. A system comprising:
   one or more processors; and
   one or more computer-readable media storing computer-executable instructions that, when executed by the one or more processors, cause the one or more processors to:
      host, at least partly by a service provider network, an application on behalf of a user account registered with the service provider network, the application comprising a first workload and a second workload;
      determine, by a computing system associated with the service provider network, that the first workload corresponds to a first workload type provided by the service provider network;
      determine, by the computing system, that the second workload corresponds to a second workload type provided by the service provider network;
      identify, by the computing system, infrastructure data associated with the user account and representing at least a portion of the application;
      generate, by the computing system, a first virtual visualization of an architecture diagram that represents the application, the architecture diagram representing at least the first workload type having a dependency on the second workload type;
      identify, by the computing system, an optimized architecture diagram from a group of optimized architecture diagrams based at least in part on the optimized architecture diagram corresponding to the architecture diagram, the optimized architecture diagram representing an application architecture that is optimized to support the application; and
      provide, from the computing system, a user device associated with the user account with access to view the first virtual visualization of the architecture diagram and a second virtual visualization of the optimized architecture diagram.

16. The system of claim 15, comprising further computer-executable instructions that, when executed, cause the one or more processors to:
   identify network communication data flowing between the first workload and the second workload in the service provider network;
   identify, at least partly using the architecture diagram, a component of the application that is limiting a rate at which the network communication data is flowing,
   wherein the first virtual visualization further includes a virtual indication that the component of the application is limiting the rate at which the network communication data is flowing.

17. The system of claim 15, comprising further computer-executable instructions that, when executed, cause the one or more processors to:
   determine a difference between the architecture diagram and the optimized architecture diagram;
   provide, to the user device, recommendation data indicating a change determined for the application based at least in part on the difference.

18. The system of claim 15, comprising further computer-executable instructions that, when executed, cause the one or more processors to:
   identify network communication data flowing between the first workload and the second workload in the service provider network;
   identify, at least partly using the architecture diagram, a component of the application that is limiting a rate at which the network communication data is flowing, the component comprising at least one of the first workload or the second workload,
   wherein first the virtual visualization includes a virtual indication that the component of the application is limiting the rate at which the network communication data is flowing.

19. The system of claim 18, comprising further computer-executable instructions that, when executed, cause the one or more processors to:
   receive, from the user device, input data indicating a user interaction associated with a portion of the first virtual visualization that corresponds to at least one of the virtual indication or the component; and
   provide, to the user device, recommendation data indicating a change determined for the application to at least one of replace or modify the component of the application.

20. The system of claim 15, comprising further computer-executable instructions that, when executed, cause the one or more processors to:
   determine that the first workload has a dependency on the second workload,
   wherein the architecture diagram represents the first workload type having the dependency on the second workload type.

21. The system of claim 15, comprising further computer-executable instructions that, when executed, cause the one or more processors to:
   identify, at least partly using the architecture diagram, an availability risk associated with the application; and determine, at least partly using the optimized architecture diagram, a change for the application that remedies the availability risk.

\* \* \* \* \*